United States Patent
Kim et al.

(10) Patent No.: US 6,892,384 B2
(45) Date of Patent: May 10, 2005

(54) DISK LOADING DEVICE FOR DISK PLAYER AND A METHOD FOR USING THE SAME

(75) Inventors: Ki-hong Kim, Youngin (KR); Hwan-seung Lee, Suwon (KR); Young-yun Seol, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 255 days.

(21) Appl. No.: 10/373,753

(22) Filed: Feb. 27, 2003

(65) Prior Publication Data

US 2003/0227856 A1 Dec. 11, 2003

(30) Foreign Application Priority Data

Jun. 10, 2002 (KR) ........................................ 2002-32282

(51) Int. Cl.[7] .............................................. G11B 17/04
(52) U.S. Cl. ...................................... 720/623; 720/645
(58) Field of Search .............................. 720/623, 645, 720/624

(56) References Cited

U.S. PATENT DOCUMENTS 5,260,925 A * 11/1993 Camps et al. ............... 720/624
5,416,763 A * 5/1995 Ohsaki ........................ 720/623

* cited by examiner

Primary Examiner—David Davis
(74) Attorney, Agent, or Firm—Roylance, Abrams, Berdo & Goodman, L.L.P.

(57) ABSTRACT

A disk loading for loading either a first or second, smaller, disk. The disk loading device comprises a main chassis, a power transmission unit, a slider, a first and second linkage mechanism, a sub-chassis, and a locking lever. The first linkage mechanism guides the first disk to a chucking position while being pushed and moved by the first disk, and moves the slider in connection with the power transmission unit when the first disk is being introduced. The second linkage mechanism connects the slider to the power transmission unit while being pushed and moved by the second disk when the second disk is moved to the chucking position. The sub-chassis is linked to a guide unit which separates the first linkage mechanism from the first disk or the second disk placed on the chucking position. The locking lever selectively locks the movement of the first linkage mechanism or releasing the locking of the first linkage mechanism.

22 Claims, 19 Drawing Sheets

DISK LOADING DEVICE FOR DISK PLAYER AND A METHOD FOR USING THE SAME

This application claims benefit under 35 U.S.C. § 119 from Korean Patent Application No. 2002-32282, filed on Jun. 10, 2002, the entire content of which is incorporated herein by reference.

BACKGROUND OF THE INVENTION

1. Field of the Invention

The present invention relates to a disk loading device for a disk player and a method for using the same. More particularly, the present invention relates to a disk loading device for a car disk player which has no disk tray, and a method for using the same.

2. Description of the Related Art

In general, a disk drive is a system for recording information to a disk and/or for reproducing recorded information from the disk. Examples of such disks includes compact disks (CD), CD-ROMs, digital video disks (DVD), DVD-ROM and the like. Such a disk drive is provided with a disk loading device for loading a disk into a position for recording information to the disk or for reproducing recorded information from the disk. The disk introduced into the disk player from the front side thereof by the disk loading device is loaded onto a turntable and then clamped by a chucking unit capable of being rotated. While the disk is rotating on the turntable, an optical pickup moves in the radial direction of the disk to record information to the disk or to reproduce recorded information from the disk.

In the case of a car disk player, the disk loading device can directly load a disk without a tray, which is eliminated due to space limitations. Furthermore, there are disk loading devices capable of classifying and loading different-sized disks, so that the disk player can use different-sized disks, such as an 80mm disk and a 120 mm disk.

FIG. 1 is a schematic view showing a conventional disk loading mechanism for a car disk drive. With reference to FIG. 1, the operation for loading an 120 mm disk will now be described.

The 120 mm disk 1 is introduced into the disk player in the front direction A. The introduced disk 1 is then engaged with a disk feeding roller 11 which is provided in a main chassis 10. At the same time, a disk detecting sensor (which is not shown) detects the presence of the disk, and a motor 3 is driven by a signal from the disk detecting sensor, thereby rotating the feeding roller 11. Then, the disk is introduced into the main chassis 10, and a side of the disk comes into contact with and pushes pin 12a of locking lever 12 outwardly, as shown in FIG. 2. Thereby, the locking lever 12 is swiveled and a locking pin 12b is released from a first locking recess 13a provided in a first guide lever 13.

Then, disk 1 is further introduced and guided while being in contact with a first guide pin 13b provided in the first guide lever 13 and a second guide pin 14a provided in a second guide lever 14, as shown in FIG. 3. Disk 1 then pushes away the guide pins 13b, 14a. Levers 13 and 14 are then pushed and swiveled in opposite directions by disk 1, which is now completely introduced into the chucking position, as shown in FIG. 4. The locking pin 12b of the locking lever 12 is locked into a second locking recess 13c, provided in the first locking lever 13, thereby fixing the first guide lever 13. The second guide lever 14 is also fixed because it is linked with the first guide lever 13.

Furthermore, disk 1, which has moved into the chucking position, pushes away the left end of a pushing lever 15 swiveling it. Then the right end of the pushing lever 15 pushes a cam guider 20 in direction B.

The cam guider 20 is moved in direction B and then a driving gear, which has been idled without being engaged with a rack gear 21 of the cam guider 20, becomes engaged with the rack gear 21. The cam guider 20 is continuously moved in direction B by the cooperation between the driving gear 4 and the rack gear 21.

Referring now to FIG. 6, as the cam guider 20 moves in direction B, a guide pin 23, provided in the cam guider 20, moves a sliding member 16 rightward while moving along a cam slot 16a formed in the sliding member 16. While the sliding member 16 is moving rightward, edge 16b of the sliding member 16, which has a certain shape, comes into contact with and pushes a guide pin 12c provided in the right end of the locking pin 12. This causes the locking pin 12b to be released from the second locking recess 13c. Guide pin 14b is also swiveled while being guided by a cam slot 16c, which is also provided in the sliding member 16. The first and second guide levers 13 and 14 are also swiveled in linkage with each other, and the guide pins 13b and 14a are separated from the disk 1. The cam guider 20 pushes the pushing lever 15 and thus the pushing lever 15 is swiveled and separated from the disk 1. While the cam guider 20 is moving in this way, a chucking lever 30 is lowered along a cam slot 25 which is provided in the cam guider 20 and chucks the disk 1, as shown in FIG. 7. As a result, the disk is seated on the turntable, now capable of being rotated.

The unloading operation of disk 1 is performed in the inverse order of the loading operation as described above.

The operation for loading an 80 mm disk will now be described. Referring to FIG. 8, a disk 2 is introduced into the main chassis 10 in direction A. Of course, the entrance of the disk 2 is detected by a sensor like disk 1 and the feeding roller 11 is driven by the signal outputted from the sensor, whereby the disk is conveyed into the main chassis 10. As shown in FIG. 9, the disk 2 pushes a guide pin 17a provided in a first linkage lever 17. This occurs while disk 2 is moved to the chucking position. Referring now to FIG. 10, the first linkage lever 17 is swiveled about the guide pin 14a in direction C, and the pin 17b forces a second linkage lever 18 to be swiveled in direction D. Pin 15a of the pushing lever 15 is then drawn by the second linkage lever 18 and the cam guider 20 is pushed to a predetermined distance in direction B. This configuration is identical as that shown in FIG. 5, and thus the cam guider 20 is moved in direction B by the driving gear 4. Referring to FIG. 11, sliding member 16 is linked to the guide pin 23 of the cam guider 20 and thus moved rightward. Consequently, sliding member 16 comes into contact with and rotates guide pin 12c of the locking lever 12, and the locking pin 12b is released from the locking recess 13c. As the guide pin 14c of the second guide lever 14 is guided by the cam slot 16c of the sliding member 16 to a predetermined distance, the first and second guide levers 13 and 14 are oppositely swiveled over a predetermined angle in relation to each other. Therefore, each guide pin 13a, 14a is separated from the disk 2. Of course, the chucking lever 7 is also lowered and chucks the disk in such a manner such that disk 2 is capable of freely rotating on the turntable.

In the case of the conventional disk loading device for the disk player constructed as described above, mechanisms for linking the cam guider 20 used in loading a disk are different from each other depending on whether the 120 mm disk is loaded or the 80 mm disk is loaded. Therefore, there is a problem in that a large number of components are needed and the construction is very complicated.

For example, because the cooperation between the first and second linkage levers 17 and 18 for loading the 80 mm disk is not always smoothly performed, a malfunction can be generated which causes the disk to be mis-seated. Also, there is the problem of power loss caused by the course of power transmission between the respective connecting members.

SUMMARY OF THE INVENTION

An object of the present invention is to solve at least the above problems and/or disadvantages and to provide at least the advantages described below. Accordingly, an object of the present invention is to provide a disk loading device for a disk player, the construction of which is improved in such a way that the construction can be simplified, the number of components can be reduced, and different-sized disks can be selectively loaded.

In order to substantially accomplish this object, an embodiment of the present invention provides a disk loading device for a disk player, which can load either a first disk or a second disk which is smaller than the first disk, into a chucking position. The disk loading device comprises a main chassis which is provided with a feeding roller, for inwardly conveying one of the first and second disks as it is being introduced, a power transmission unit for transmitting the power of a driving motor to the feeding roller, a slider which is mounted on the main chassis to be reciprocated in the loading direction of the introduced disk, the slider being selectively connected to the power transmission unit to be driven to-and-fro, depending on its moving position, and a first linkage mechanism which guides the first disk to the chucking position while being pushed and moved by the first disk and moves the slider to be connected to the power transmission unit when the first disk is being introduced, The disk loader further comprises a second linkage mechanism, which connects the slider to the power transmission unit while being pushed and moved by the second disk, when the second disk is moved to the chucking position while being contacted with, and guided by the first linkage mechanism. A sub-chassis is also provided in the disk loader, which is linked to the slider and reciprocated in the direction transverse to the loading direction, whereby a guide unit linked to the sub-chassis separates the first linkage mechanism from the first disk, or the second disk placed on the chucking position, Additionally, a locking lever is also provided in the disk loader according to an embodiment of the present invention, which is moved in linkage with the introduced first disk or the sub-chassis, the locking lever selectively locking the movement of the first linkage mechanism or releasing the locking of the first linkage mechanism.

According to a further embodiment of the invention, the first linkage mechanism comprises a first swivel plate which is mounted on the main chassis, capable of being rotated over a predetermined angle, the first swivel plate being pushed and swiveled by the first disk as being introduced. A second swivel plate is provided which is linked to the first swivel plate and mounted on the main chassis to be capable of rotating over a predetermined angle. The second swivel plate is pushed and swiveled by the first disk and selectively locked to, or released from, the locking lever. The first linking mechanism further comprises a first pushing lever which is pivotably mounted on the main chassis, the first pushing lever linked to the second swivel plate, which is pushed and swiveled by the first disk and pushes the slider such that it is connected to the power transmission unit. First and second springs are additionally provided in this embodiment of the present invention for elastically biasing the first and second swivel plates toward a position, respectively, where the first and second swivel plates come into contact with the first disk.

In the preferred embodiment of the invention, each of the first and second swivel plates has a guide roller for guiding the disk. During the introduction of the first disk, each swivel plate is movable between an initial position, a neutral position and a separating position. The initial position of the swivel plate is defined as that position prior to being contacted with the first disk, the neutral position of the swivel plate is defined as that position when pushed by the first disk and guided to the chucking position. The separating position of the swivel plate defined as that position when the swivel plate separates the guide roller from the first disk placed in the chucking positions.

In another preferred embodiment of the invention, the second swivel plate comprises a first locking recess which is formed in an edge of the second swivel plate. The first locking recess is locked by the locking lever when the second swivel plate is in the initial position. The second swivel plate also includes a second locking recess, which is formed in the edge of the second swivel plate, located a distance away from the first locking recess. The second locking recess is locked by the locking lever when the second swivel plate is in the neutral position. The swivel plate additionally includes a guide pin which is guided by the sub-chassis and moves the second swivel plate from the neutral position to the separating position.

Furthermore, it is preferable that the second linkage mechanism comprises a second pushing lever which is pivotably mounted on the second swivel plate, the second pushing lever being pushed and swiveled by the second disk when the second disk is introduced, and pushing the slider to be connected to the power transmission unit. A spring for compressing the second pushing lever toward a position where the pushing lever comes into contact with the introduced second disk is also provided in the second linkage mechanism.

The second disk is preferably guided to the chucking position by a contact pin provided at one end of the second pushing lever, and the first and second swivel plates.

When the second disk moves to the chucking position, the first and second swivel plates are preferably separated from the second disk by the sub-chassis, which is linked to the slider, and the second pushing lever is pushed by the slider and thus separated from the second disk.

In a further embodiment of the invention, the second linkage mechanism comprises a second pushing lever which is pivotably supported on the first linkage mechanism, the second pushing lever being pushed and swiveled by the second disk which is moved into the chucking position, and pushes the slider to be connected to the power transmission unit. A spring for compressing the second pushing lever in the direction where the pushing lever comes into contact with the introduced second disk is also provided in the second linkage mechanism.

The second pushing lever is preferably contacted with, and moved by, the first disk, which is introduced into the chucking position and separated from the first disk by being pushed and swiveled by the main chassis when the first linkage mechanism is separated from the first disk.

In another preferred embodiment of the invention, the sub-chassis comprises a sliding cam slot to which a cam projection provided on the slider is engaged, the cam projection being guided in the direction transverse to the loading direction, and a separating cam slot to which a guide pin provided on the first linkage mechanism is engaged, the guide pin being guided, so that the first linkage mechanism is separated from the first disk or the second disk placed on the chucking position.

In another preferred embodiment of the invention, the separating cam slot comprises an arc shaped main slot part which guides the movement of the guide pin when the first disk moves to the chucking position, a first slot part which is extended from the upper end of the main slot part to guide the guide pin so that the first linkage mechanism is separated from the first disk placed on the chucking position, and a second slot part which is extended from the main slot part to guide the guide pin so that the second linkage mechanism is separated from the second disk placed on the chucking position.

Additional advantages, objects, and features of the embodiments of the invention will be set forth in part in the description which follows and in part will become apparent to those having ordinary skill in the art upon examination of the following, or may be learned from practice of the invention. The objects and advantages of the embodiments of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The following detailed description will present a disk loading device for a disk player in accordance with a preferred embodiment of the present invention in reference to the accompanying drawings.

Figure 12:
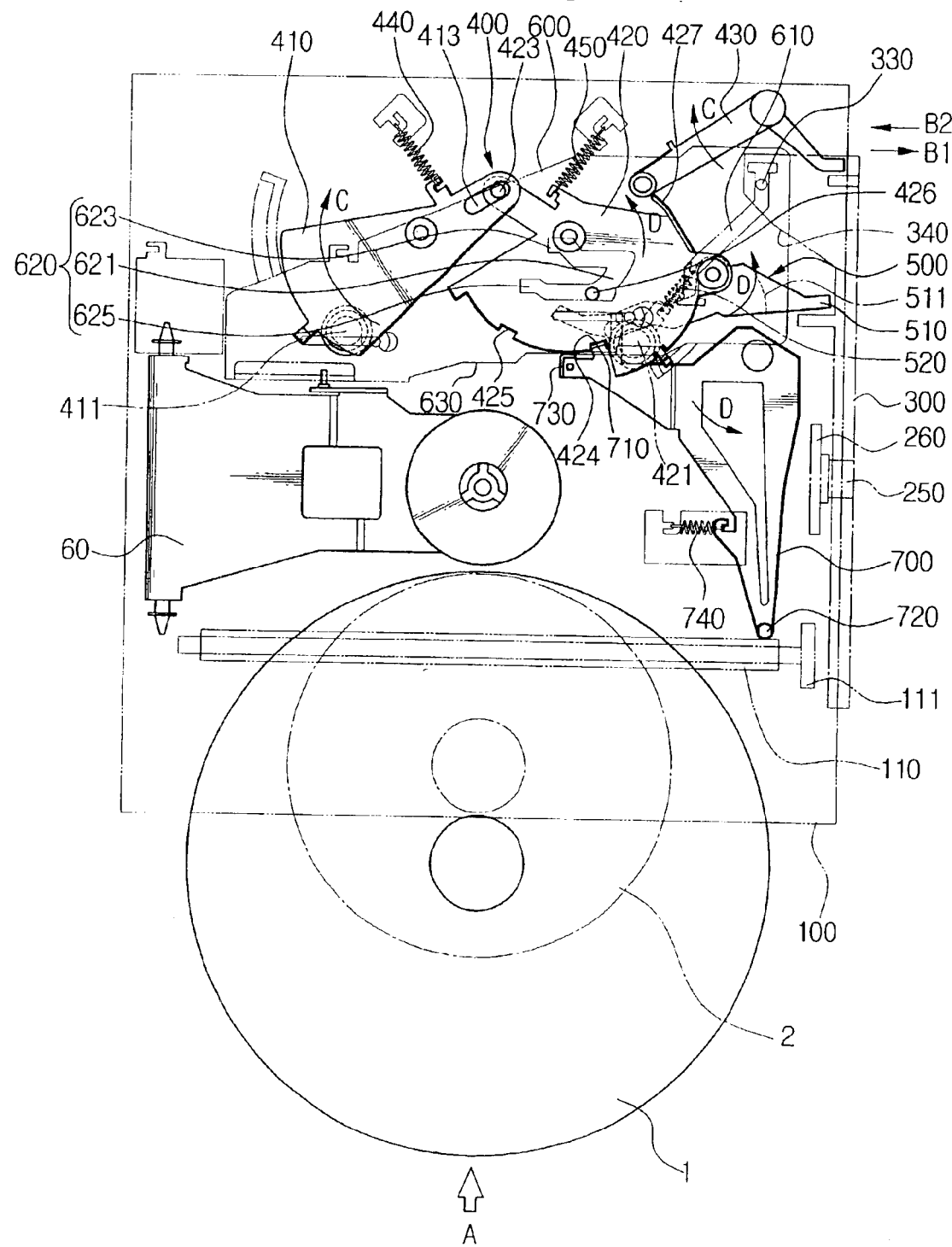
FIG. 12 is a top plan view of an example of the disk loading device for a disk player in accordance with an embodiment of the present invention.
Figure 13:
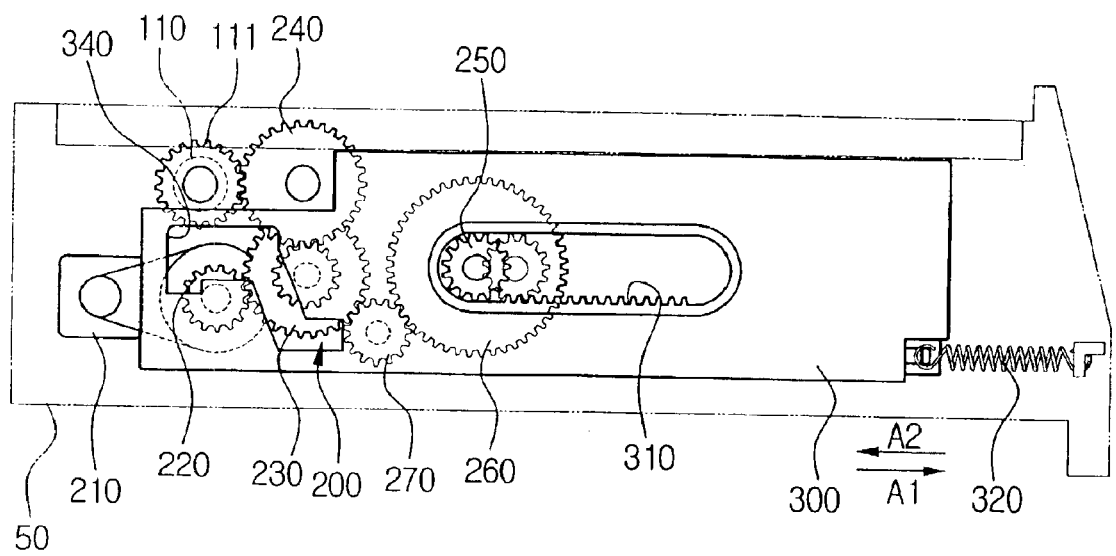
FIG. 13 is a side view of an example of the disk loading device for the disk player in accordance with an embodiment of the present invention.

Referring to FIGS. 12 and 13, the disk loading device for a disk player in accordance with an embodiment of the present invention comprises: a main chassis 100, on which a rotatable feeding roller 110 is provided; a power transmission unit 200, which transmits the power of a driving motor 210 to the feeding roller 110; a slider 300 which is selectively connected to the power transmission unit 200 to be driven back and forth; a first linkage mechanism 400, which is operated when a first disk 1 is loaded; a second linkage mechanism 420?(400) which is operated when a second disk 2 which is smaller than the first disk 1 is loaded; a sub-chassis 600 which is reciprocated in linkage with the slider 300; and a locking lever 700.

In the following discussion, the first disk 1 is a conventional 120 mm disk and the second disk 2 is a conventional 80 mm disk. The disk loading device according to an embodiment of the present invention is applicable to a disk player in which different-sized disks can be loaded interchangeably without a tray. An example of such a disk player is one used in a car.

In FIG. 12, the feeding roller 110 is rotated by power transmission unit 200, so that the feeding roller 110 carries the introduced disk into the disk player or discharges the loaded disk out of the disk player. The feeding roller 110 is supported at its opposite ends by hinge units which are not shown. As the hinge units are pivotally installed and swiveled by the slider 300, the feeding roller 110 is allowed to be in contact with, or separated from, the disk, which is introduced into, or discharged out of the disk player.

The main chassis 100 is mounted on the top of the housing 50, within which an optical pickup (not shown) is installed. The main chassis 100 is provided with a chucking unit 60 which chucks the first or second disk 1 or 2 to the chucking position on the turntable (not shown).

The power transmission unit 200 comprises a driving motor 210, mounted within the housing 50, a plurality of interconnecting gears 220, 230, and 240, which transmit the power of the driving motor 210 to a driven gear 111, which is connected to the feeding roller 110; a driving gear 250 which is selectively engaged with a rack gear 310 provided in the slider 300; and a main gear 260 which is coaxially connected to the driving gear 250. An intervening gear 270 is connected between the main gear 260 and the interconnecting gear 230. Because the driving motor 210 is bi-directionally rotatable, the driving motor 210 selectively drives the feeding roller 110 to be rotated in a selected direction. The slider 300 is also movable back and forth in the disk loading/unloading direction.

The slider 300 is connected to the main chassis 100 and is capable of reciprocating in the disk loading direction. Slider 300 has the rack gear 310 formed in a predetermined length. Initially, rack gear 310 is separated from the driving gear, until the first or second disk 1 or 2 is loaded into the chucking position. In addition, the slider 300 is elastically biased by a spring 320 in direction A1 (as shown in FIG. 13). When the first disk 1 is loaded, the slider 300 is pushed by the first linkage mechanism 400 and connected to the driving gear 250. When the second disk 2 is loaded, the slider 300 is pushed by the second linkage mechanism 500 and thus connected to the driving gear 250. The slider 300 also includes a cam projection 330 for moving the sub-chassis 600 in the directions B1 and B2 (as shown in FIG. 12) transverse to the directions A1 and A2 when the slider 300 moves in the directions A1 and A2.

When the first disk 1 is introduced into the housing 50, the first linkage mechanism 400 is pushed by the first disk 1 and guides it to the chucking position. The first linkage mechanism 400 also moves the slider 300 and connects the slider to the power transmission unit 200. The first linkage mechanism 400 is comprised of a first swivel plate 410, a first pushing lever 430, and first and second springs 440, 450. First swivel plate 410 is installed on the main chassis 100 to provide the capability of rotating over a predetermined angle. The second swivel plate 420 is installed on the main chassis 100, and is be linked to the first swivel plate 410 to provide the capability of rotating over a predetermined angle. The first pushing lever 430 is linked to the second swivel plate 420 in order to push away the slider 300 to a predetermined length in the direction A1. The first and second springs 440 and 450 bias the first and second swivel plates 410 and 420 to come into contact with the introduced first disk 1.

The first swivel plate 410 includes a first guide roller 411 which comes into contact with the first disk 1 as it is being introduced, and guides the first disk 1 to the chucking position. The disk introduced in the direction A1 pushes away the first guide roller 411 causing the first swivel plate 410 to be rotated in the direction C. An end of the first swivel plate 410 is formed with an elongate aperture 413.

Figure 15:
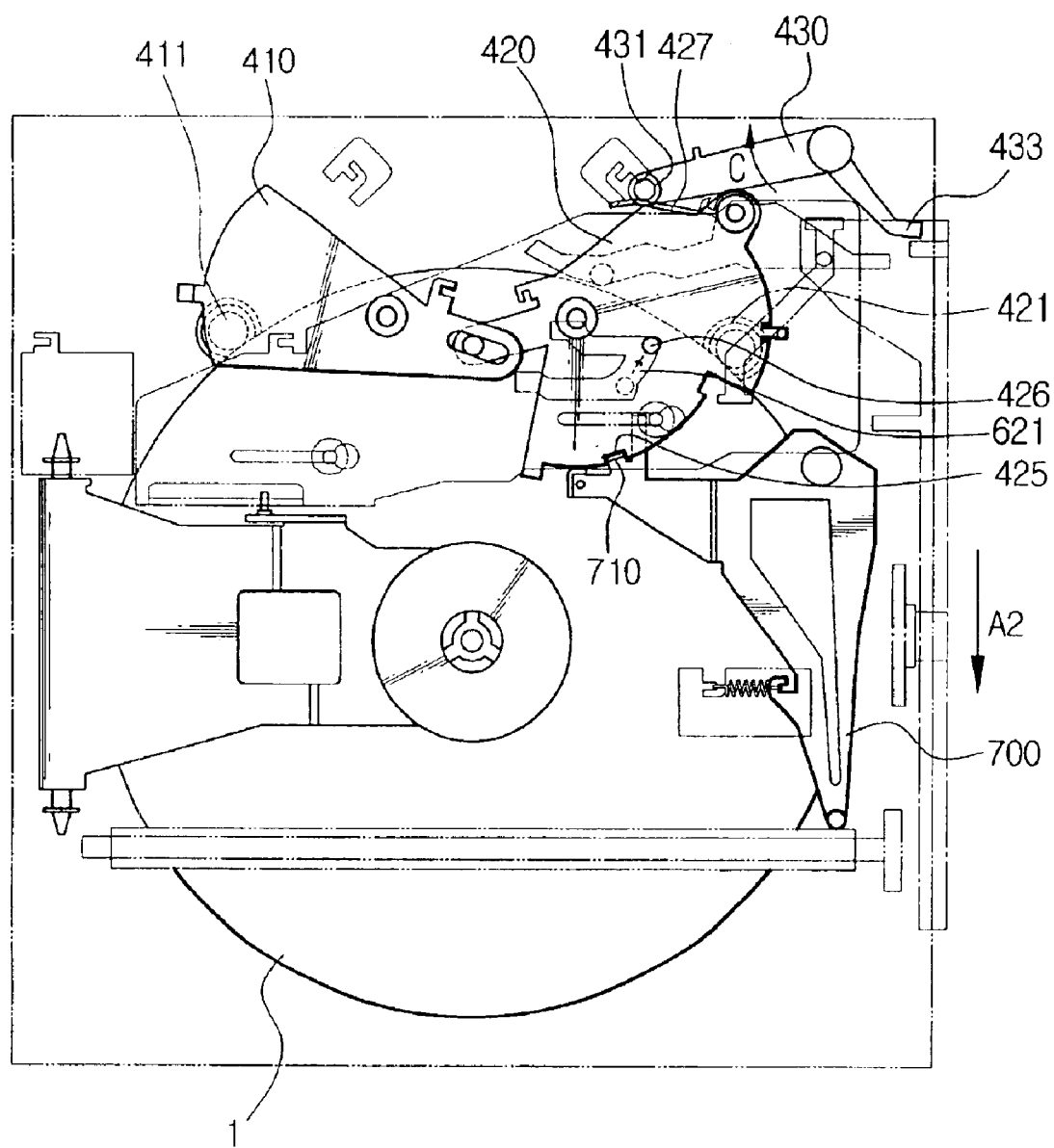

Similarly to the first swivel plate 410, the second swivel plate 420 includes a second guide roller 421 which comes into contact with the first disk 1 as it is being introduced, and guides the first disk 1 to the chucking position. The second swivel plate 420 also includes a pin 423 which is introduced into the elongate aperture 413, so that it is linked to the first swivel plate 410. In addition, the second swivel plate 420 has a first locking recess 424 formed in an edge thereof to be locked by a locking projection 710 provided in a locking lever 700 (to be described below), when it is in the initial position (as shown in FIG. 12), where the first disk 1 is not introduced. The second swivel disk 420 is also formed with a second locking recess 425 which is spaced from the first locking recess 424. If the second swivel plate 420 is pushed away by the first disk as it is being introduced and thus further rotated in the direction D, the locking projection 710 is engaged with the second locking recess 425 as shown in FIG. 15. In this manner, if the second swivel plate 420 is located in the "neutral position", the first disk 1 is laid on the chucking position and each of the first and second guide rollers 411, 421 are in contact with the first disk 1.

As further shown in FIG. 12, a guide pin 426 is formed on the top surface of the second swivel plate 420 and projected from the top surface. The guide pin 426 is guided by means of the movement of the sub-chassis 620 and further rotates the second swivel plate 420 from the "neutral position" in the direction D. Therefore, the first swivel plate 410 is also further rotated in the direction C in linkage with the second swivel plate 420, and the first and second guide rollers 411 and 421 can be separated from the first disk 1. The second swivel plate 420 also includes a contact portion 427 which is formed by bending apart of the edge of the second swivel plate 420. The contact portion 427 pushes away one end of the first pushing lever 430 to rotate in the direction C, when the second 420 is further rotated from the neutral position of FIG. 12 in the direction D to the position as shown in FIG. 15. Therefore, the other end of the first pushing lever 430 pushes away the slider 300 in the direction A1 while the first pushing lever 430 is being rotated in the direction C. Consequently, the rack gear 310 and the driving gear 250 are engaged with each other.

The first and second springs are individually connected to the main chassis 100 and elastically bias the first and second swivel plates 410, 420 to be positioned at their "initial positions."

The second linkage mechanism 500 serves to connect the slider 300 to the power transmission unit 200 while being pushed by the second disk 2 as being introduced. The second linkage mechanism 500 comprises a second pushing lever 510 which is rotatably mounted on the second swivel plate 420, and a spring which biases the second pushing lever 510 in the direction D. As one end of the second pushing lever 510 is pushed by the second disk 2 when it is being introduced into the chucking position, the second pushing lever 510 is swiveled and the other end of the second pushing lever 510 pushes the slider 300 in the direction A. Because the first pushing lever 430 is not moved when the second disk 2 is introduced, the second pushing lever 510 moves the slider 300 while being pushed by the second disk 2, whereby the rack gear 310 and the driving gear are engaged with each other. One end of the spring 520 is connected to the second swivel plate 420 and the other end is connected to the second pushing lever 510. Therefore, the spring 520 is moved together with the second pushing lever 510 and elastically biases the second pushing lever 510 to come into contact with the second disk 2.

Figure 17:
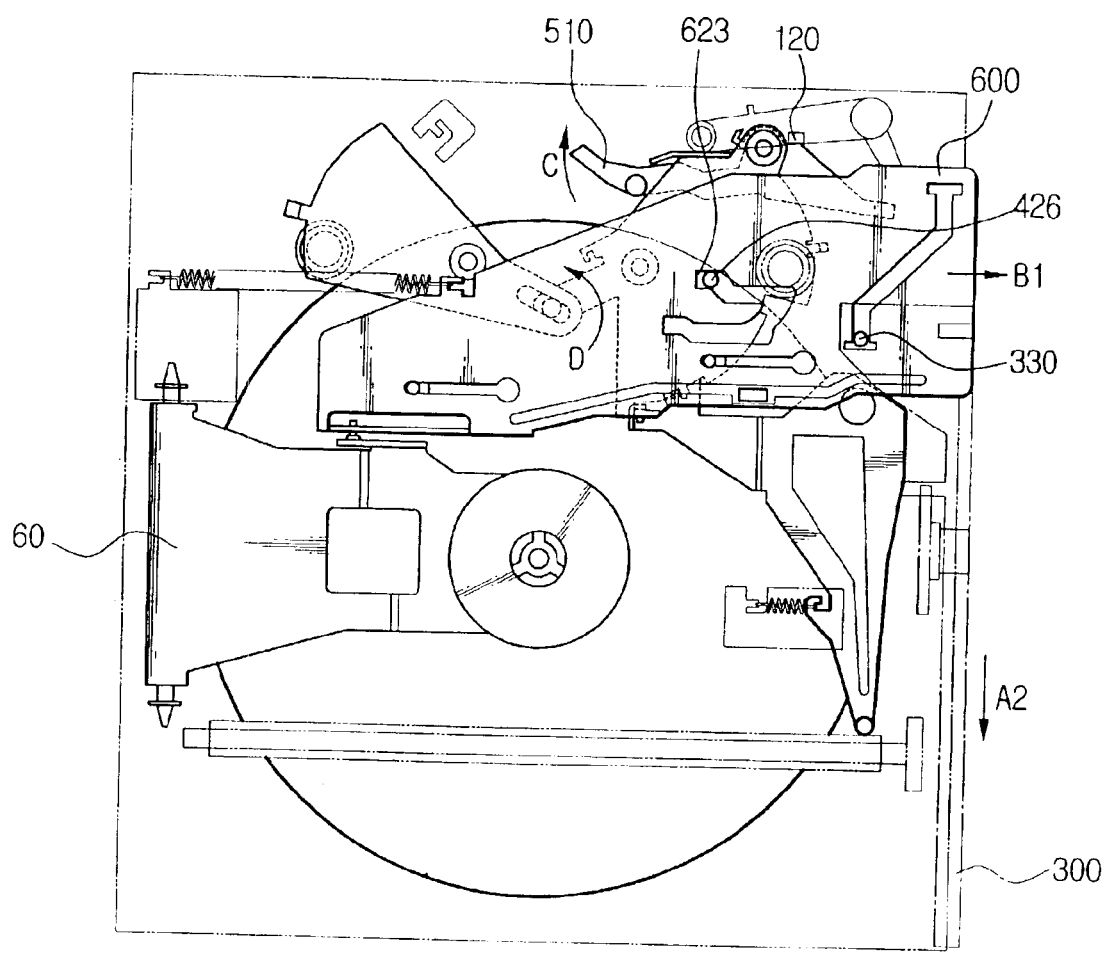

When the first disk 1 is introduced, the second pushing lever 510 is moved together with the second swivel plate 420 in the direction D in the position that it is in contact with the first disk 1. When the second swivel plate 420 is fully rotated in the direction D and thus the first guide roller 421 is separated from the first disk as shown in FIG. 17, the first pushing lever 510 comes into contact with the projection formed on the main chassis 100 and rotates in the direction C, and is thereby separated from the first disk 1.

When the second disk is introduced, the second pushing lever 50 is pushed at one end by the second disk 2 and moves the slider 300 in the direction A1. As the slider 300 is continuously moved in the direction A1, a lateral projection 330 formed on the slider 300 pushes away the cam portion 510 of the second pushing lever 510, whereby the second pushing lever 510 is separated from the second disk 2.

Sub-chassis 600 is mounted on the top of the main chassis 100 and is capable of being reciprocated in the directions B1, B2. The sub-chassis 600 is reciprocated in linkage with the slider 300 and moves the first linkage mechanism 400 which is separated from the first and second disk 1 and 2 when they are laid on the chucking position. The sub-chassis 600 includes a sliding cam slot 610 to which the cam projection 330 of the slider 300 is engaged. When the slider 300 is moved in the direction A1 or A2, the cam slot 610 is drawn and guided by the cam projection 330, and the sub-chassis 600 is moved. The sub-chassis 600 also includes a separating cam slot 620 to which the guide pin 426 of the second swivel plate 420 is engaged.

The separating cam slot 620 serves to guide the movement of the guide pin 426 in order to separate the first linkage mechanism 400 (i.e., the first and second guide rollers 411 and 421) from the first disk 1 or the second disk 2, respectively. The separating cam slot 620 has an arc shaped main slot part 621, a first slot part 623 extended from the upper end of the main slot part 621, and a second slot part 625 extended from the lower end of the main slot part 621. The first slot part 623 is formed to be symmetrical with the second slot part 625. The first slot part 623 functions to separate the first and second guide rollers 41 1and 421 from the first disk 1 when it is laid on the chucking position. Therefore, when the first disk 1 is introduced, the guide pin 426 is moved upwardly from the initial position along the main slot part 621 and when the sub-chassis 600 is moved in the direction B1, the guide pin is further moved upwardly by the stepped portion of the first slot part 623, whereby the first and second guide rollers 411, 421 are separated from the first disk 1.

The second slot part 625 serves to guide the movement of the guide pin 426 in order to separate the first linkage mechanism 400 from the second disk 2 when it is laid on the chucking position. When the second disk 2 (which is smaller than the first disk 1) is introduced, the first and second guide rollers 411, 412 come into contact with the second disk 2 in their initial positions. Therefore, the guide pin 426 is maintained in its initial position as shown in FIG. 12. In this state, if the sub-chassis 600 is moved in the direction B1, the guide pin 426 is guided to the stepped portion of the second slot part 625 and rotates the second swivel plate 420 in the direction D, and the first swivel plate 410 is swiveled in linkage with the second swivel plate 420. Subsequently, the first and second guide rollers 411, 412 are separated from the second disk.

The locking lever 700 is rotated in linkage with the sub-chassis 600, which is moved in the direction B1 as the first disk 1 is introduced into the housing. This selectively locks the movement of the first linkage mechanism 400 or releases the locking of the first linkage mechanism 400. The locking lever 700 is installed on the main chassis 100 such that it can be rotated. One end of the locking lever 700 is provided with an interference pin 720 which comes into contact with the first disk 1 as it is being introduced. The other end of the locking lever 700 is provided with a locking projection 710 which is locked into any of the first and second locking recesses 424 and 425. The locking lever 700 is elastically compressed against the second swivel plate 420 in the locking direction by a spring 740 connected to the main chassis 100. When the sub-chassis 600 is moved in the direction B1, the guide projection 730 is contacted with and pushed by the lower edge 730 of the sub-chassis 700, and thus the locking lever 700 is swiveled in the same direction, so that the locking lever 719 can be released from the first locking recess 424 or the second locking recess 425.

The operation of the disk loading device for the disk player according to the embodiment of the present invention having the aforementioned construction will now be described in detail.

The operation of loading an 120 mm disk, i.e., the first disk 1 will first be described.

The first disk 1 is introduced into the housing 50 in the loading direction, i.e., in the direction A1, as shown in FIG. 12. A disk detecting sensor, which is not shown, detects introduction of the first disk 1 and drives the driving motor 210 (see FIG. 13). The feeding roller 110 then rotates and conveys the first disk 1 into the interior of the housing 50.

Figure 14:
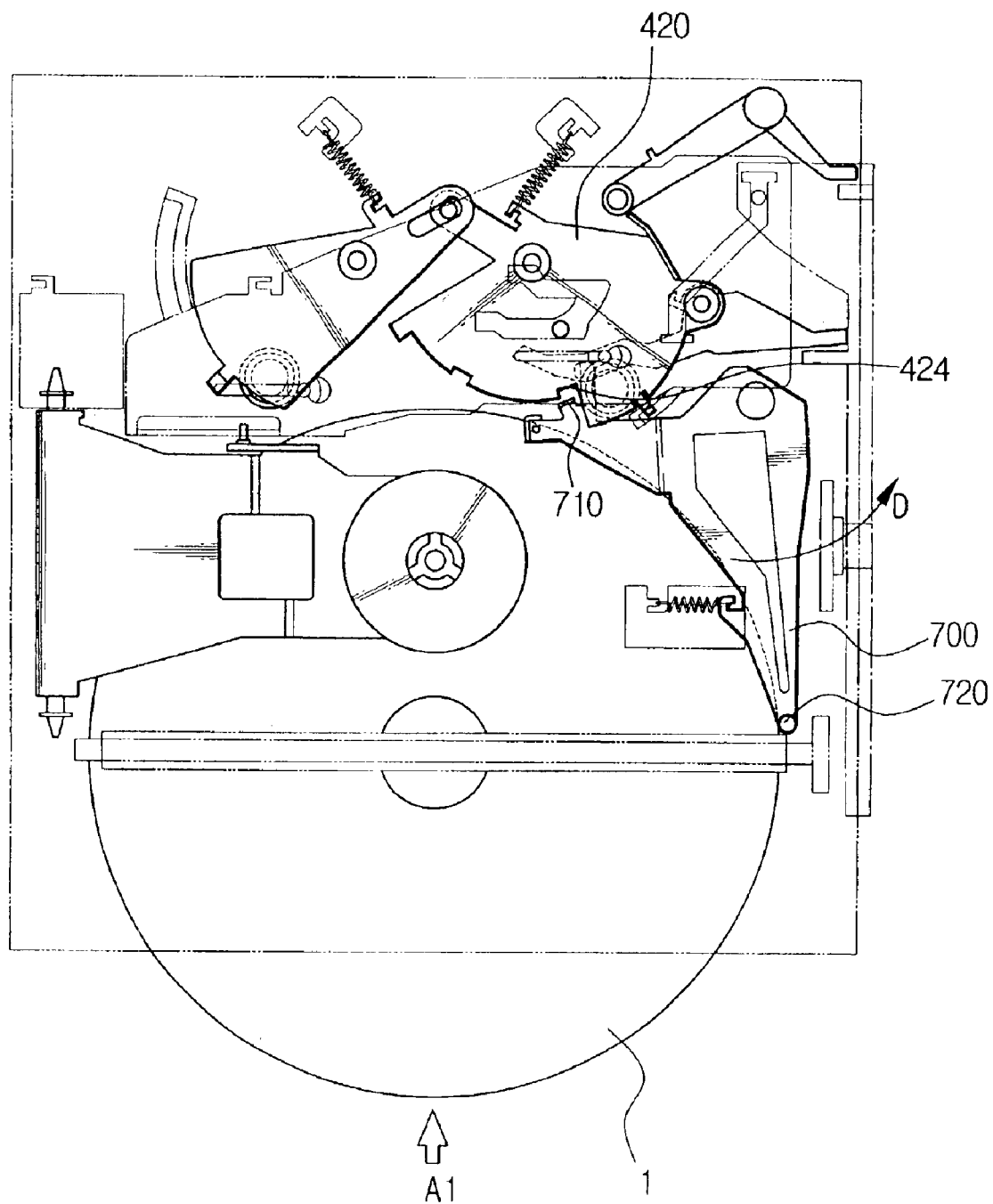
FIGS. 14 through 17 illustrate an example of the operation of loading an 120 mm disk into the disk loading device for a disk player in accordance with an embodiment of the present invention.

Referring to FIG. 14, the first disk 1 comes into contact with the locking lever 700 and rotates the locking lever 700 in the direction D while being introduced. Then, the locking projection 710 of the locking lever 700 is separated from the first locking recess 424 of the second swivel plate 420. In this state, if the first disk 1 is further introduced, the disk 1 moves into the chucking position while pushing the first and second rollers 411 and 421, as shown in FIG. 15. Therefore, the first swivel plate 410 and the second swivel plate 420 are swiveled in opposite directions and the guide pin 426 moves upwardly along the main slot part 621. The contact part 427 of the second swivel plate 420 then pushes away one end of the first pushing lever 430. Following this, the first pushing lever 430 rotates in the direction C and the other end 433 of the pushing lever 430 pushes the slider 300 to a predetermined distance in the direction A2.

Thereafter, the locking lever 700 is returned to its initial position and the locking projection 710 is locked into the second locking recess 425 formed in the second swivel plate 420. The first and second guide rollers 411and 421 are then positionally fixed in the state where the first and second guide rollers 411 and 421 are in contact with the first disk 1.

Figure 16:
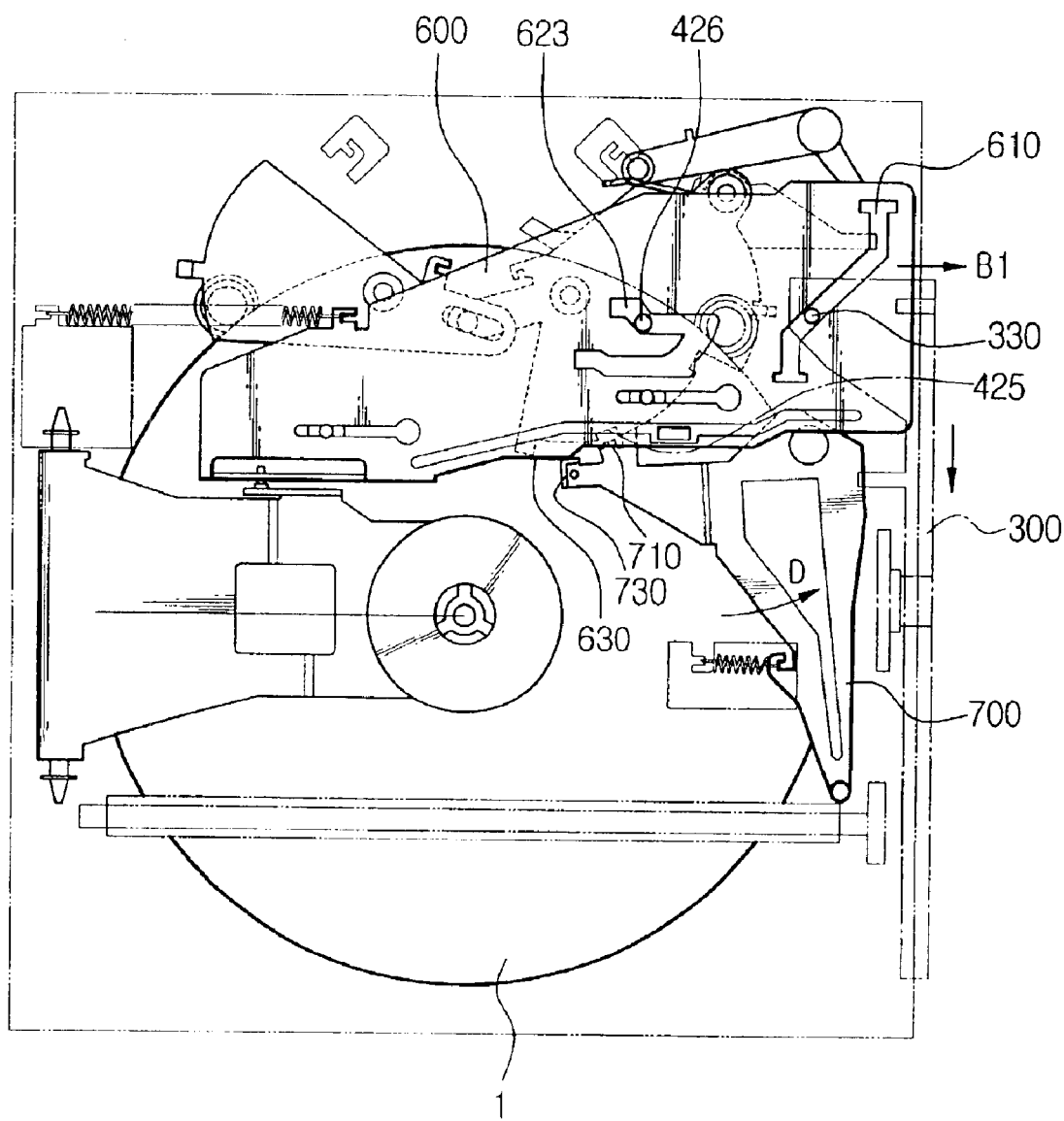

Referring to FIG. 13, as the slider 300 is pushed to a predetermined distance in the direction A2, the rack gear 310 is engaged with the driving gear 250. The power of the driving gear 250 is then transmitted to the rack gear 310, and thus the slider A2 is moved continuously in the direction A2. The cam slot 610 of the sub-chassis 600 is guided by the movement of the cam projection 330, and the sub-chassis 600 is moved in the direction B1, as shown in FIG. 16. When the sub-chassis 600 is moved in the direction B1, the guide pin 426 is introduced into the first slot part 623. The edge 630 of the sub-chassis 600 pushes away the guide projection 730 of the locking lever 700, so that the locking lever 700 is swiveled in the direction D. Thereafter, the locking projection 710 is separated from the second locking recess 425 and thus the locking lever 700 is released. In this state, if the slider 300 is additionally moved in the direction A2, the sub-chassis 600 is drawn and filly moved in the direction BI by the cam projection 330 as shown in FIG. 17. Guide pin 426 rotates the second guide swivel plate 420 in the direction D while being guided to the first slot part 623, whereby the first and second guide rollers 411 and 421 are separated from the first disk 1.

When the second swivel plate 420 is swiveled over a predetermined angle by the first slot part 623, one end of the second pushing lever 510 is contacted with and supported by the projection 120 formed in a position on the main chassis 100 to be projected downwardly. Therefore, the second pushing lever 510 is rotated over a predetermined angle in the direction C and separated from the first disk 1. In this manner, if the guide rollers 411 and 421 and the second pushing lever 510 are separated from the first disk 1, the first disk 1 is adapted to be capable of being rotated on the turntable (not shown) in the position that it is chucked by the chucking unit 60. Of course, the guide roller 110 is lowered and separated from the first disk 1 because the hinge unit of the guide roller is swiveled while being guided to a cam slot 340 provided in the slider 300. In this state, the first disk 1 is rotated on the turntable and information is recorded or reproduced by a pickup device (not shown).

Figure 1:
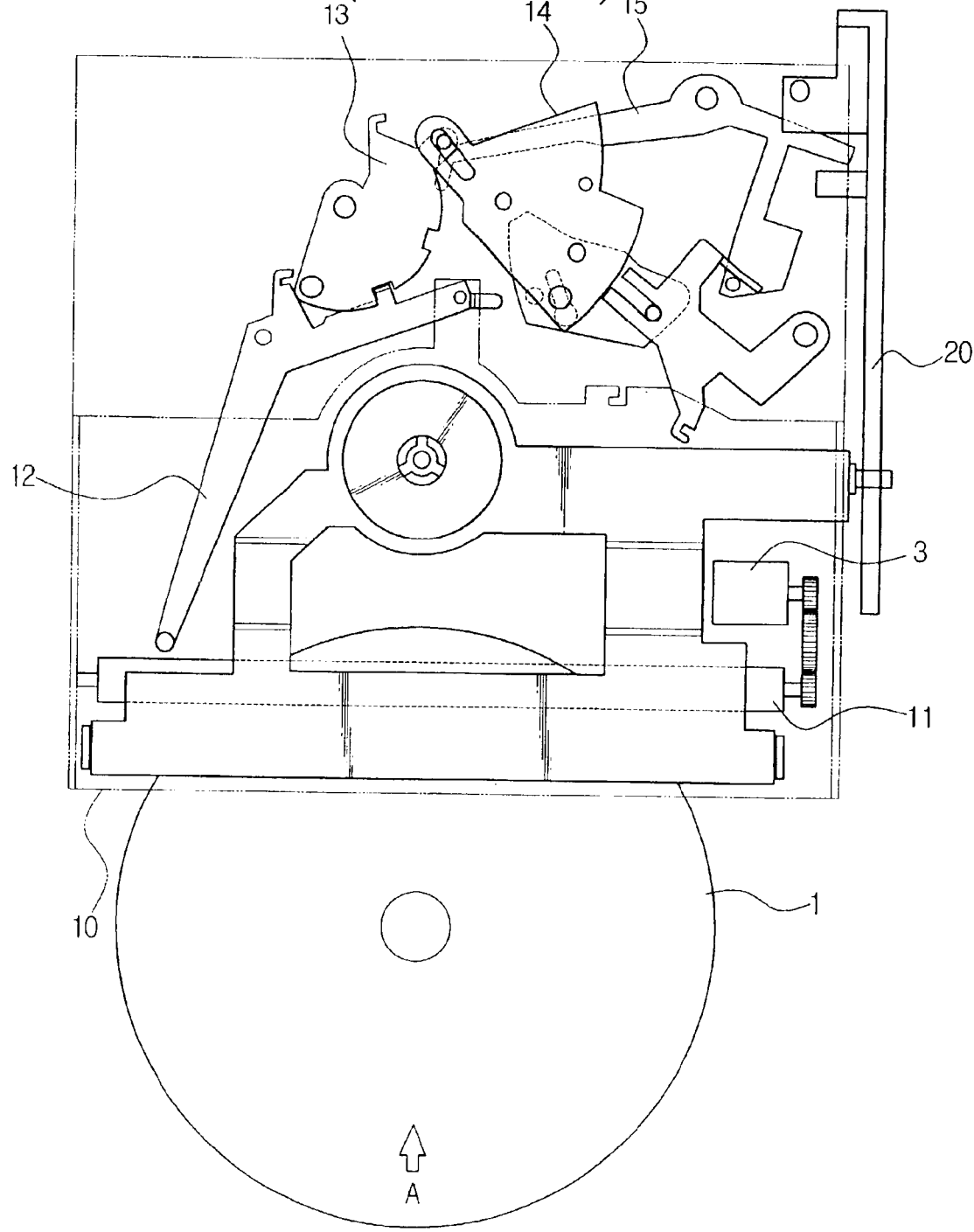
FIG. 1 is a top plan view of an example of conventional disk loading device for a disk player.
Figure 2:
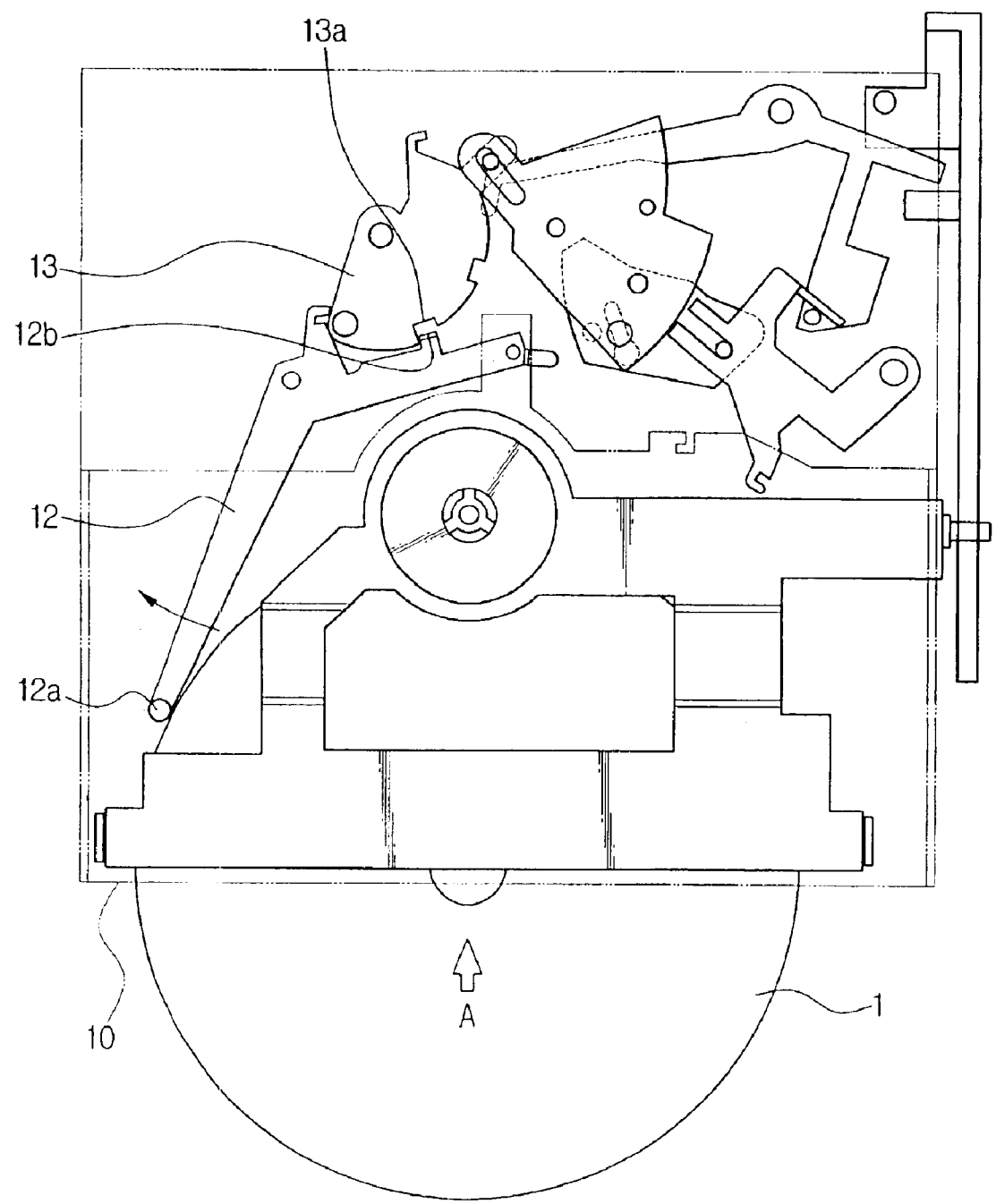
FIGS. 2 through 7 illustrate an example of the operation of loading a 120 mm disk into the conventional disk loading device for a disk player.
Figure 3:
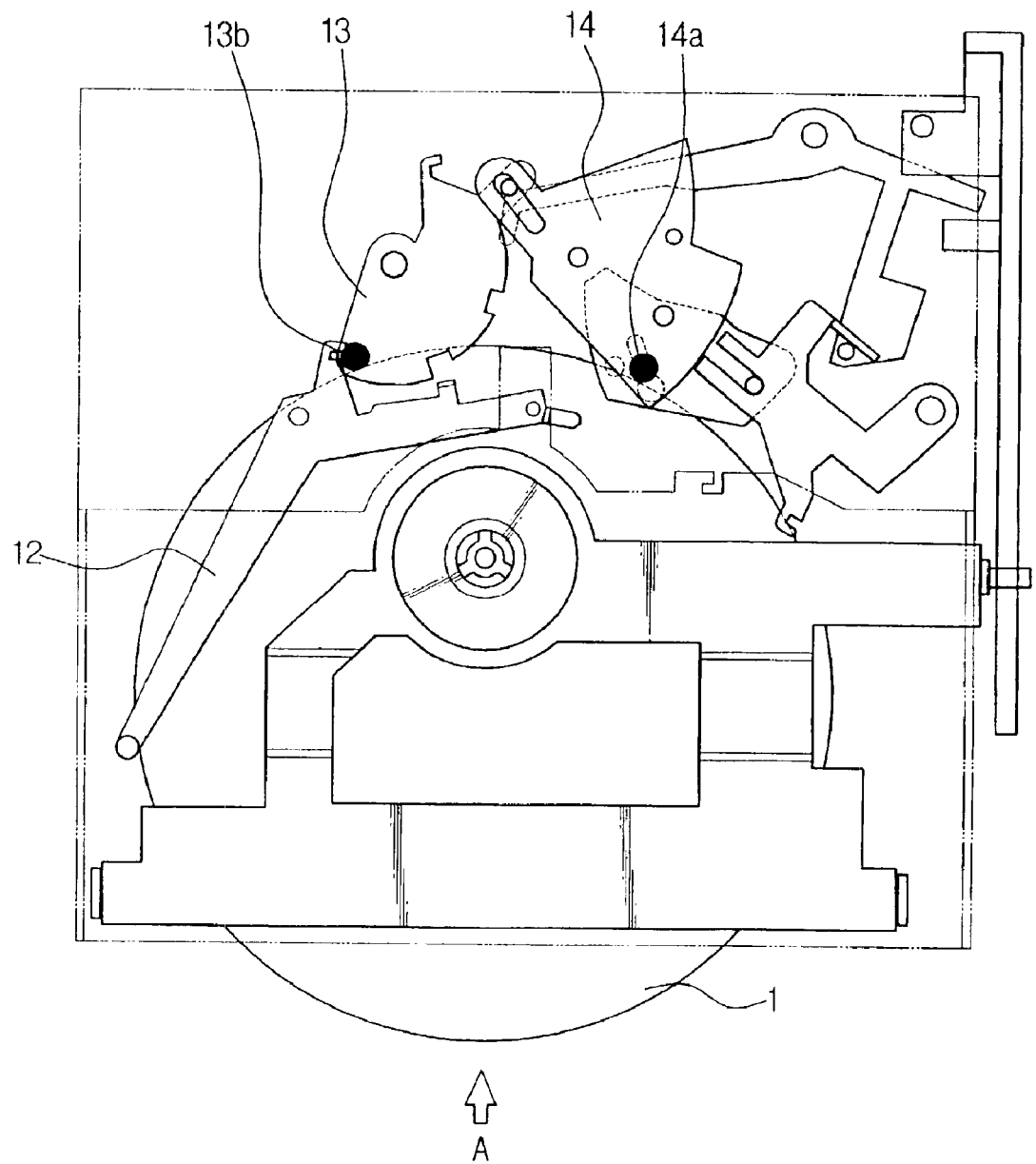
Figure 4:
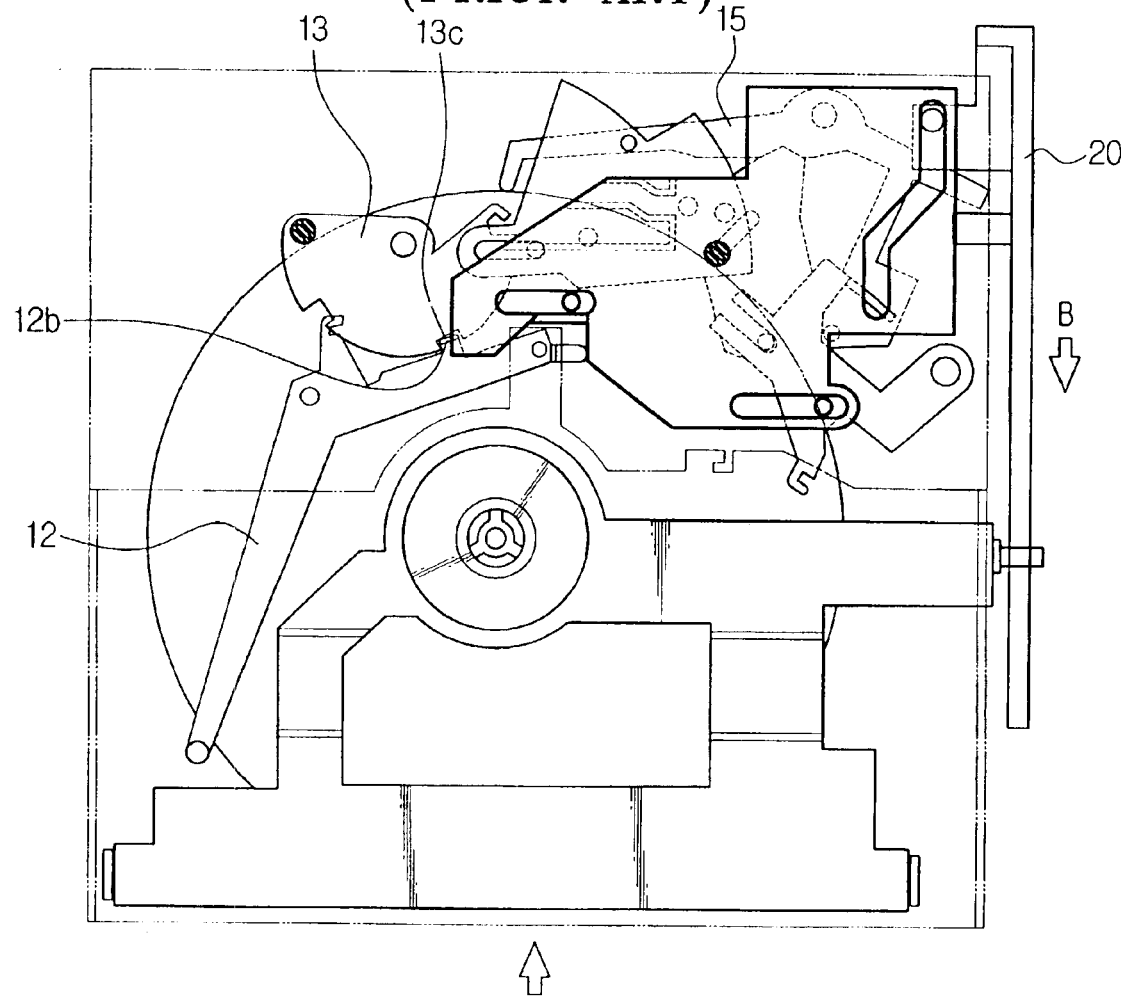
Figure 5:
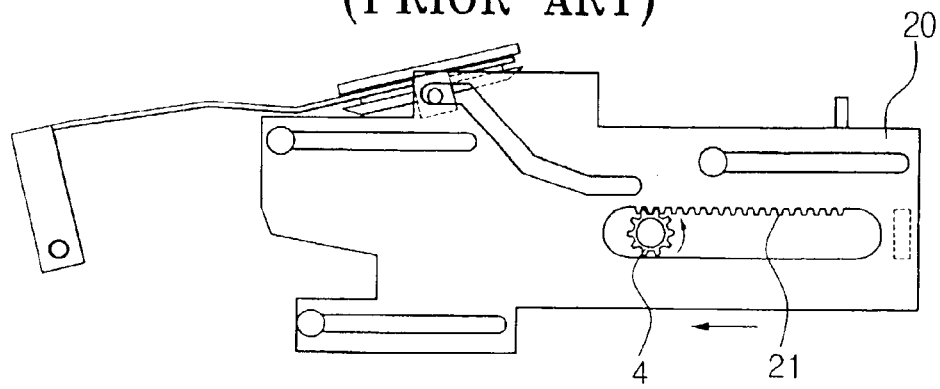
Figure 6:
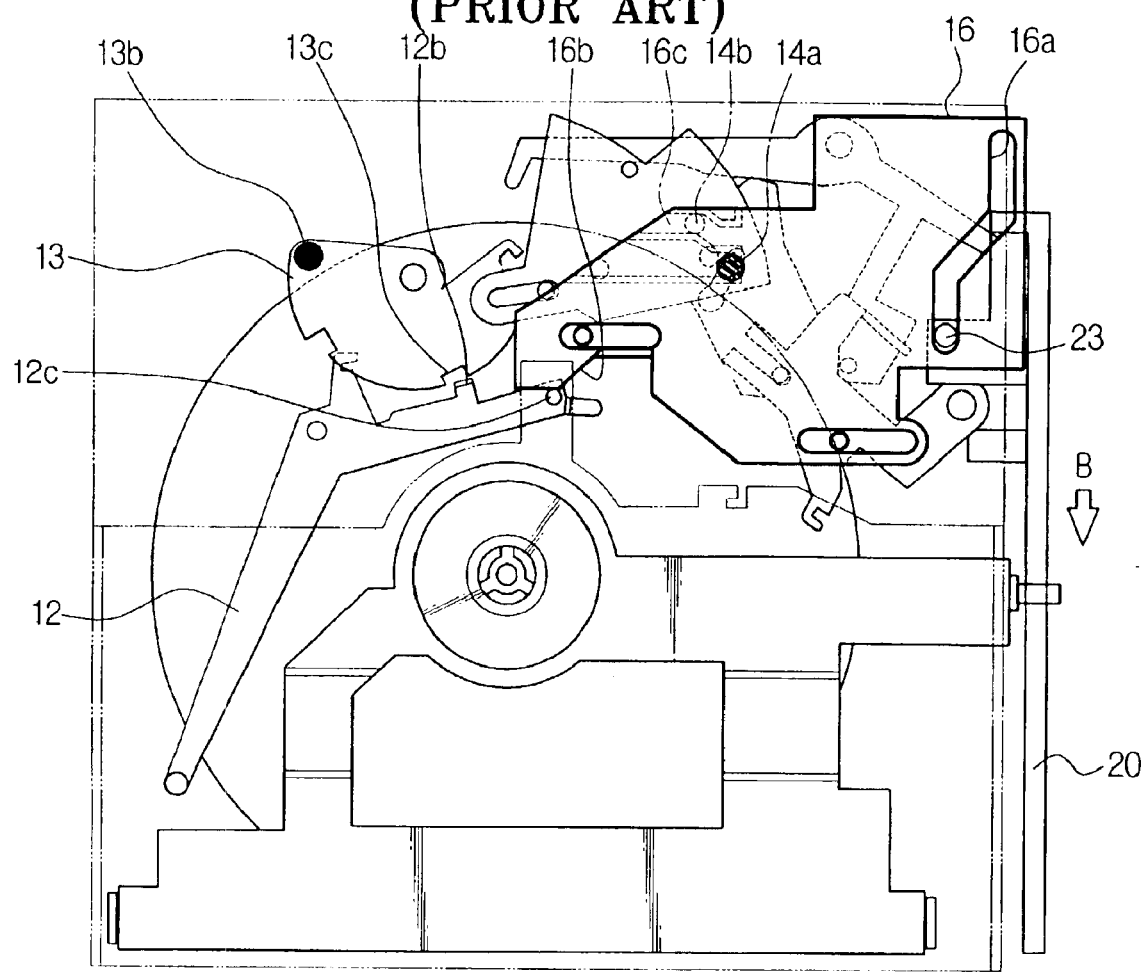
Figure 7:
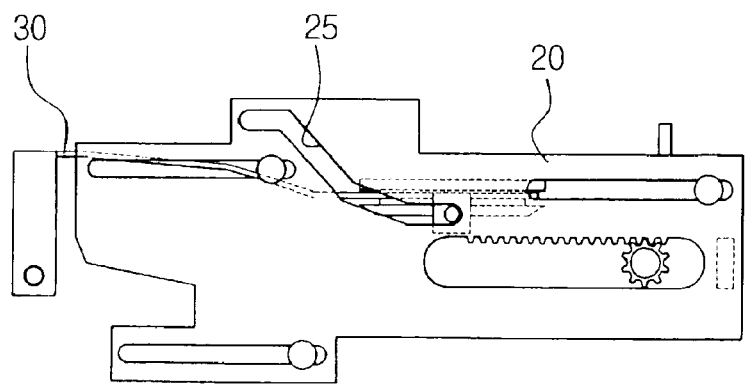
Figure 8:
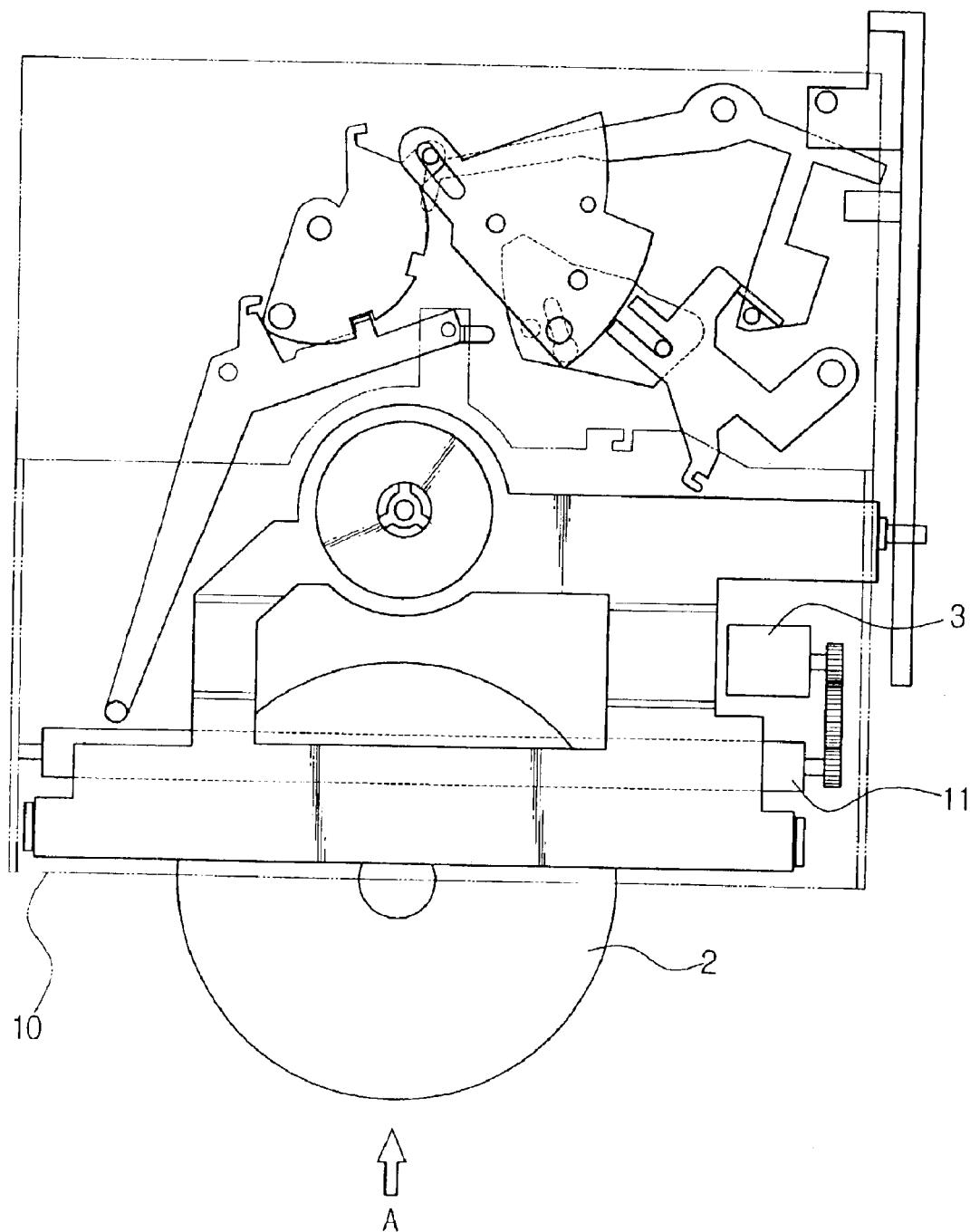
FIGS. 8 through 11 illustrate an example of the operation of loading an 80 mm disk into the conventional disk loading device for a disk player.
Figure 9:
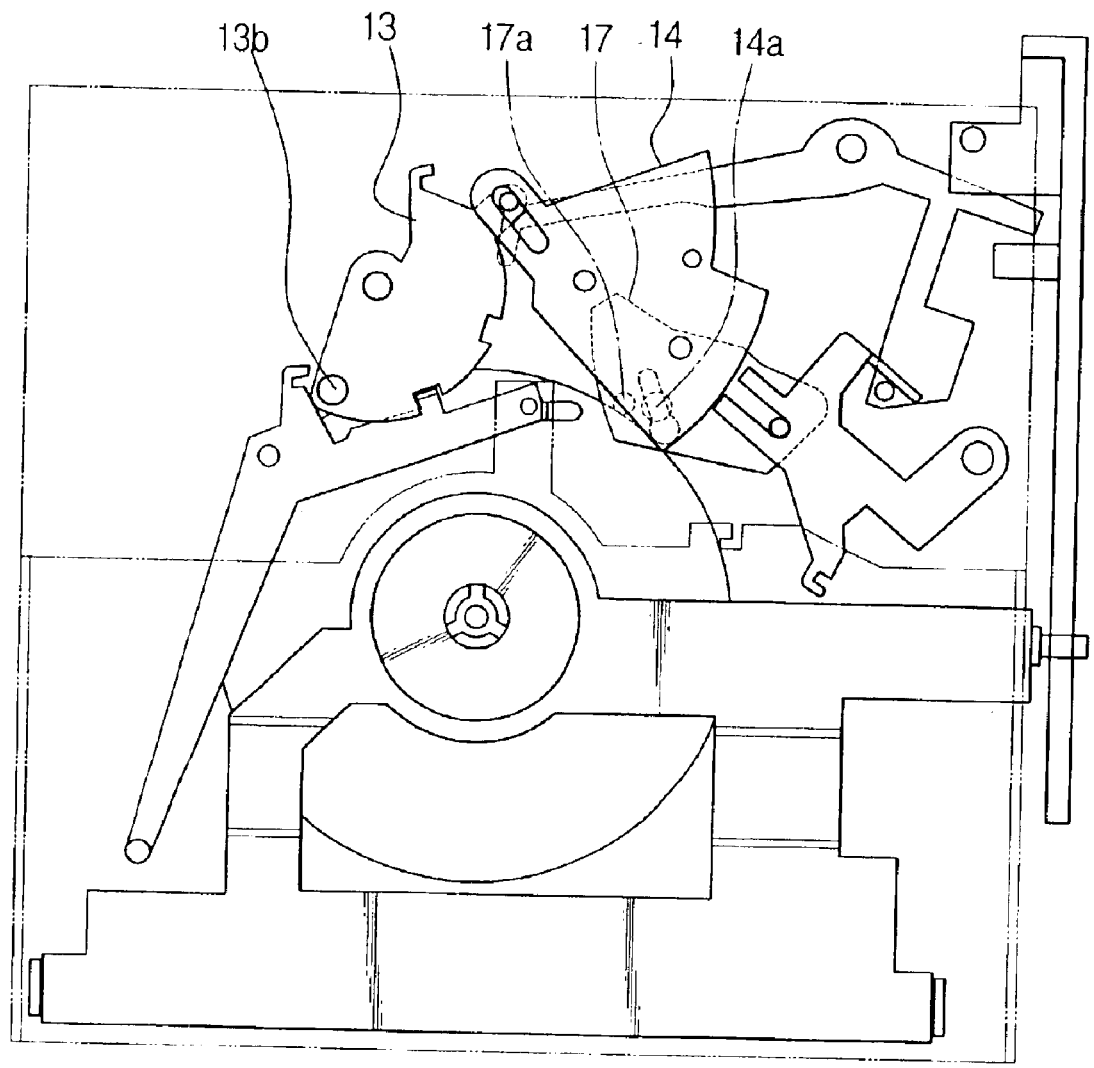
Figure 10:
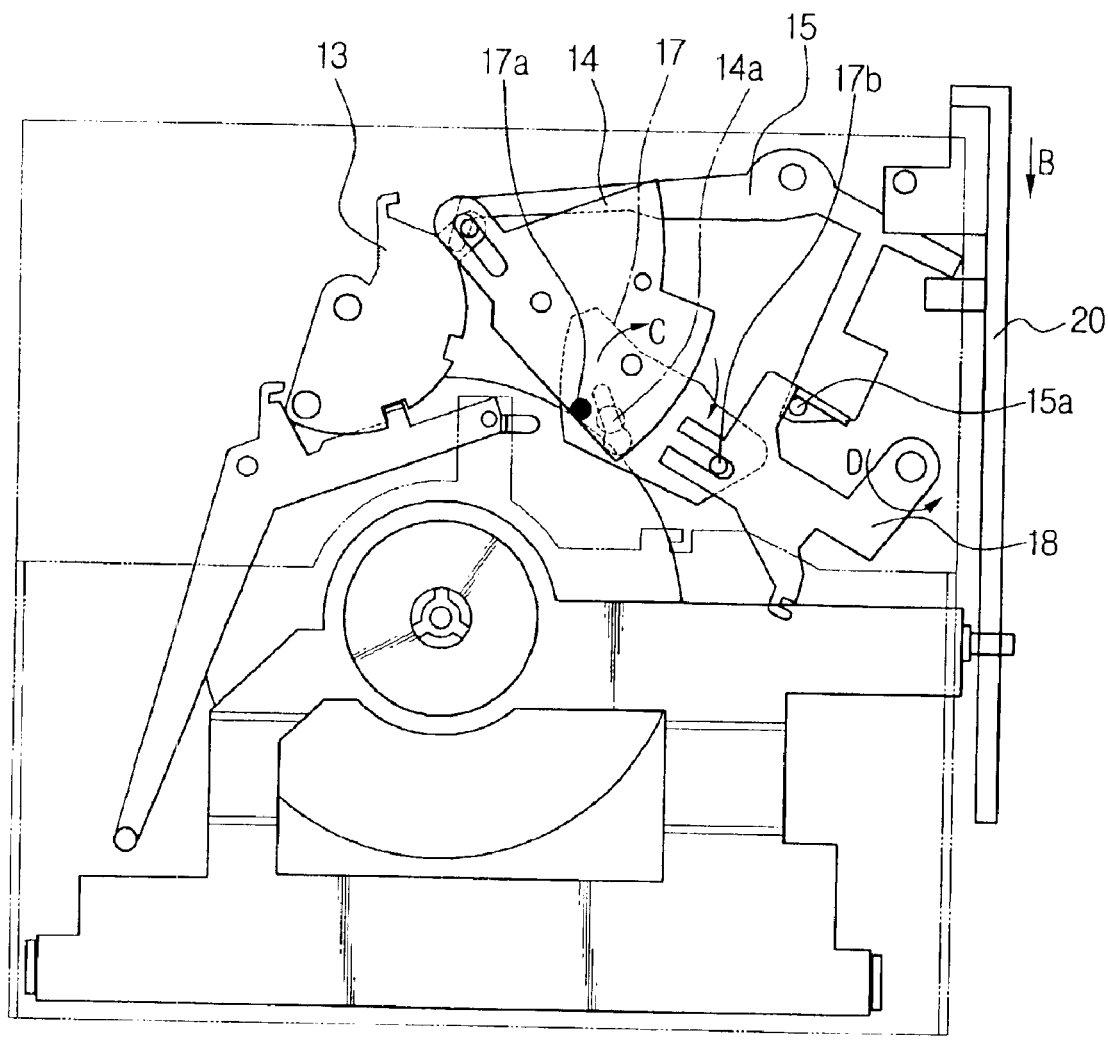
Figure 11:
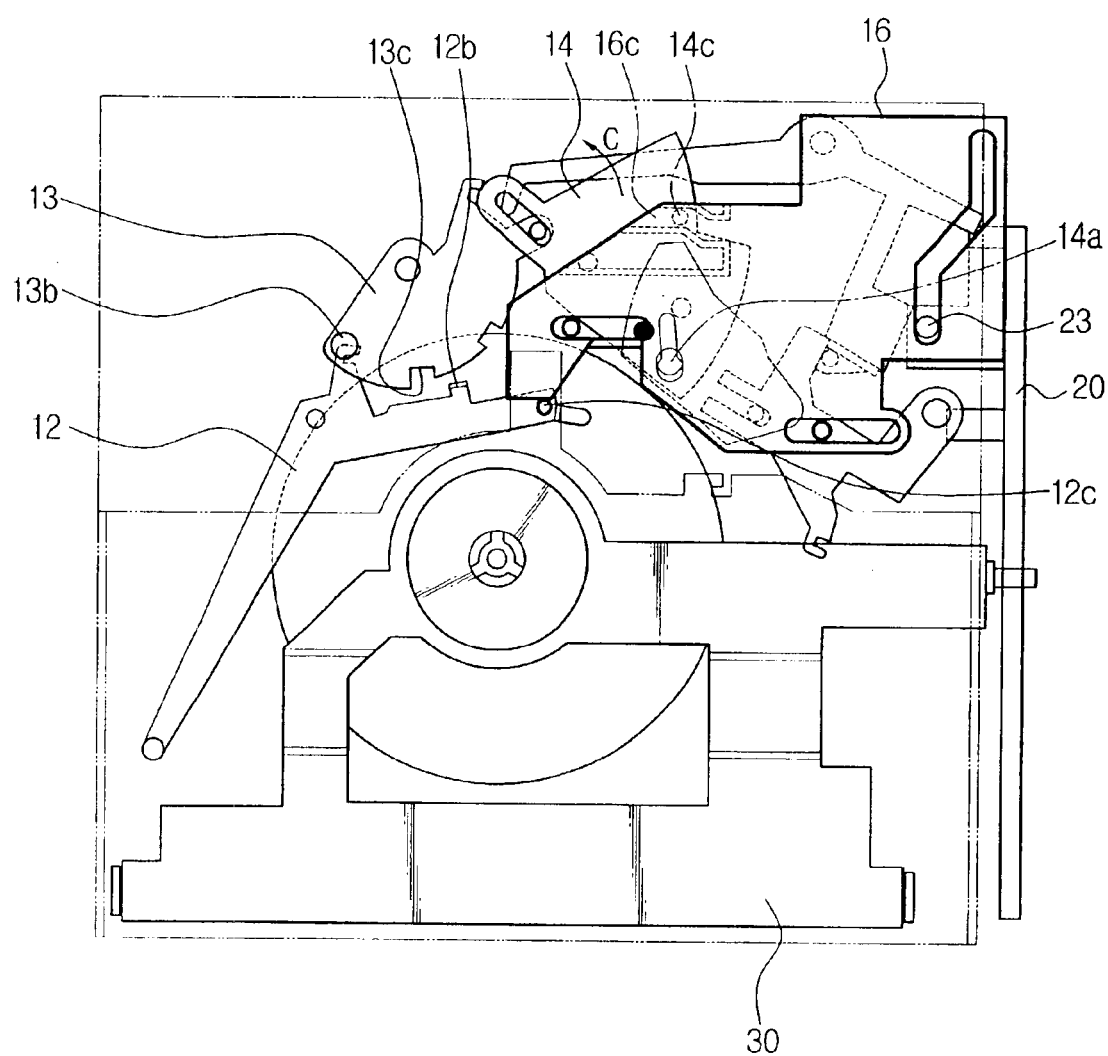

Meanwhile, in order to unload the first disk 1 which has been completely loaded as described above, rotation of the driving motor 210 is reversed and the slider 300 is returned in the direction A1. Then, the sub-chassis 600 is returned in the direction B2 (FIG. 2). The unloading operation is performed in the order reverse to the loading operation and the first disk 1 is ejected out of the housing 50.

The operation of loading the second disk 2 will now be described in reference to FIG. 18. Second disk 2 is an 80 mm disk, which is smaller than the first disk 1.

Figure 18:
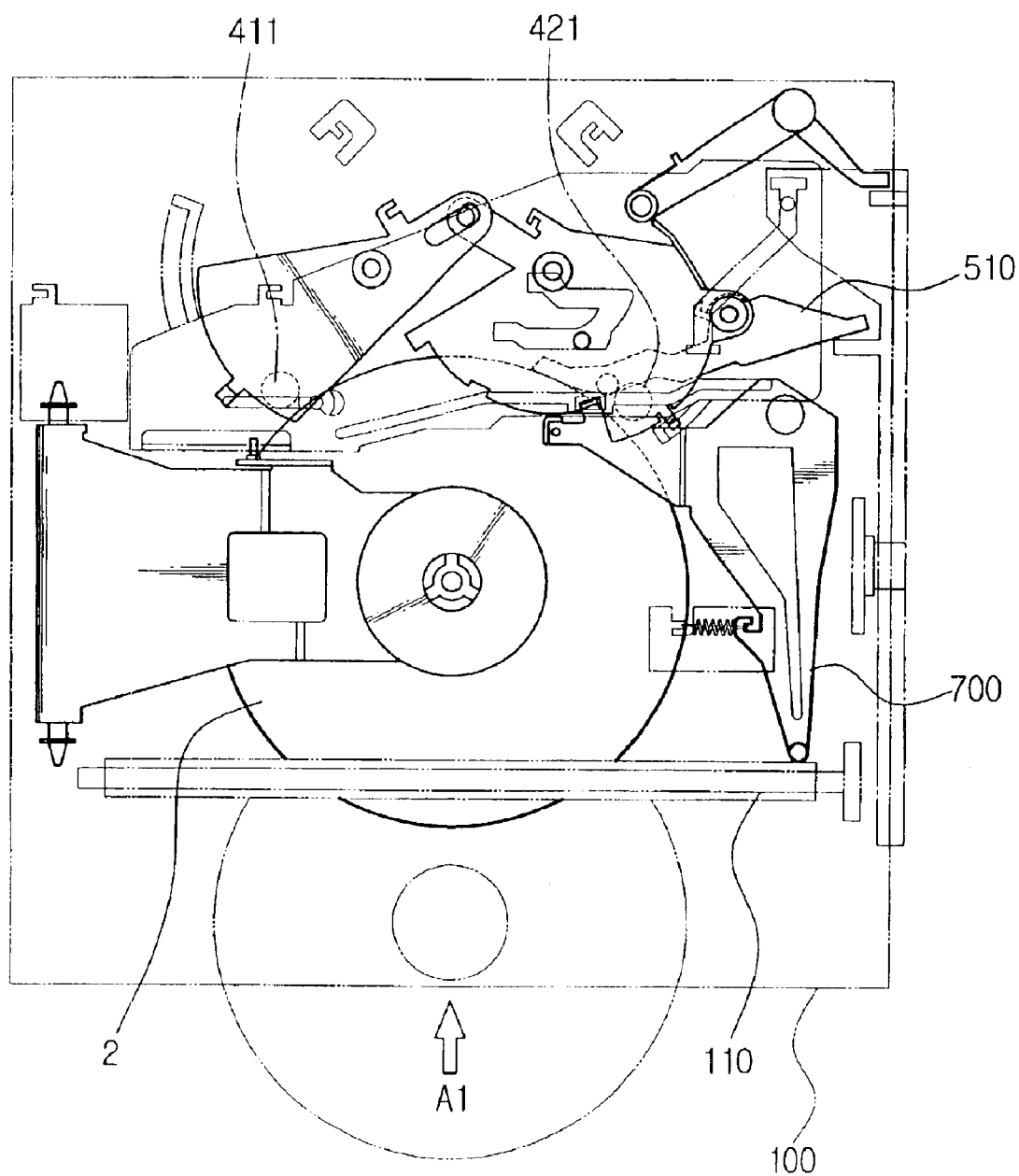
FIGS. 18 through 21 illustrate an example of the operation of loading an 80 mm disk into the disk loading device for a disk player in accordance with an embodiment of the present invention.
Figure 19:
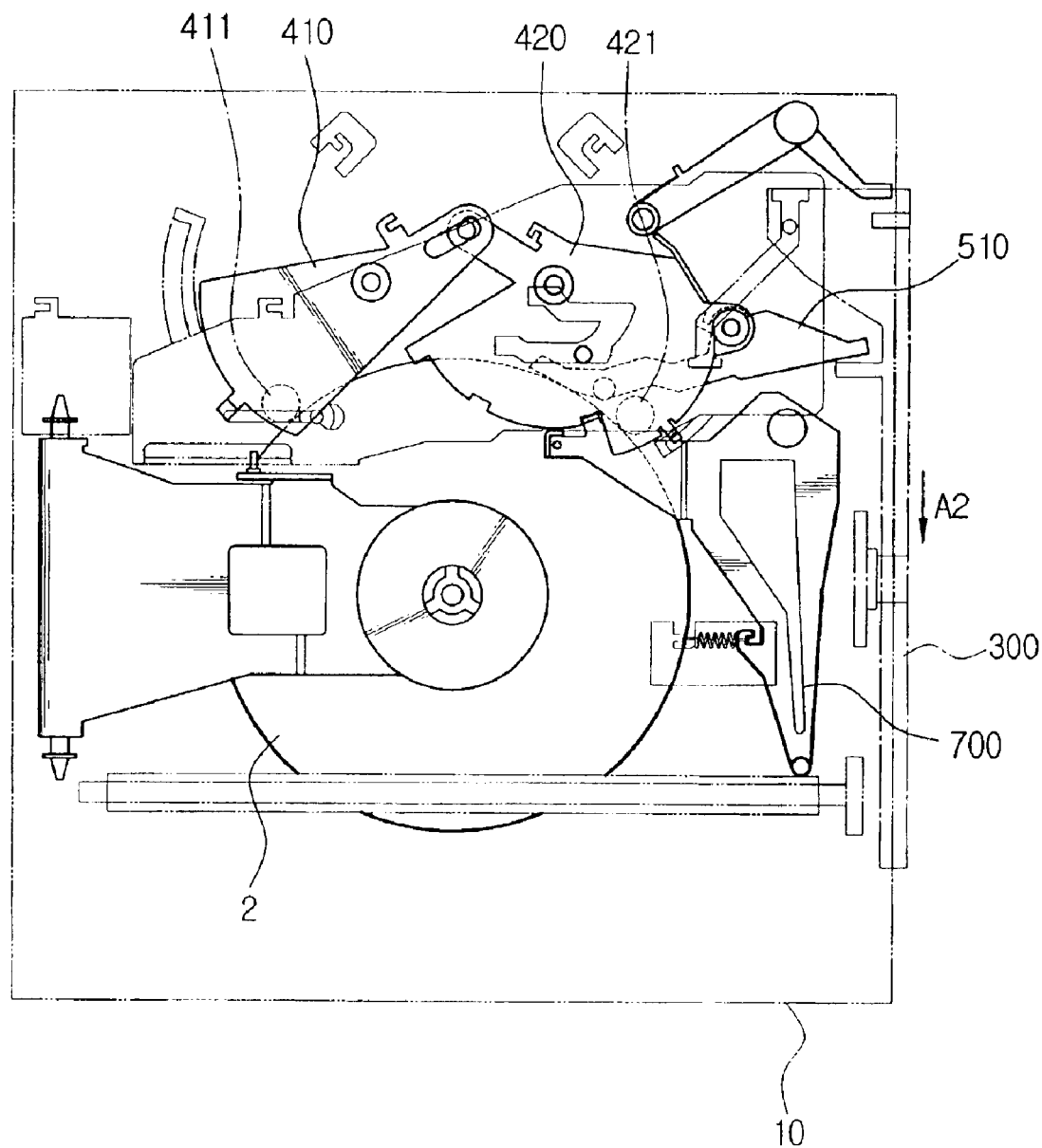

As indicated by a phantom line in FIG. 18, the second disk 2 is introduced into the underside of the main chassis 100 and engaged with the feeding roller 110. Then, the feeding roller 110 rotates and conveys the second disk 2 to the position as indicated by a solid line in FIG. 18. This time, because the diameter of the second disk 2 is smaller than first disk 1, it does not interfere with the locking lever. The second disk 2 then comes into contact with one end of the second pushing lever 510 before it is contacted with the first and second guide rollers 411 and 421. If the second disk 2 is further introduced in this manner, the second pushing lever 510 is pushed and rotated by the second disk 2 as shown in FIG. 19. In addition, the pushing lever 510 pushes away the slider 300 in the direction A2 while being rotated.

Figure 20:
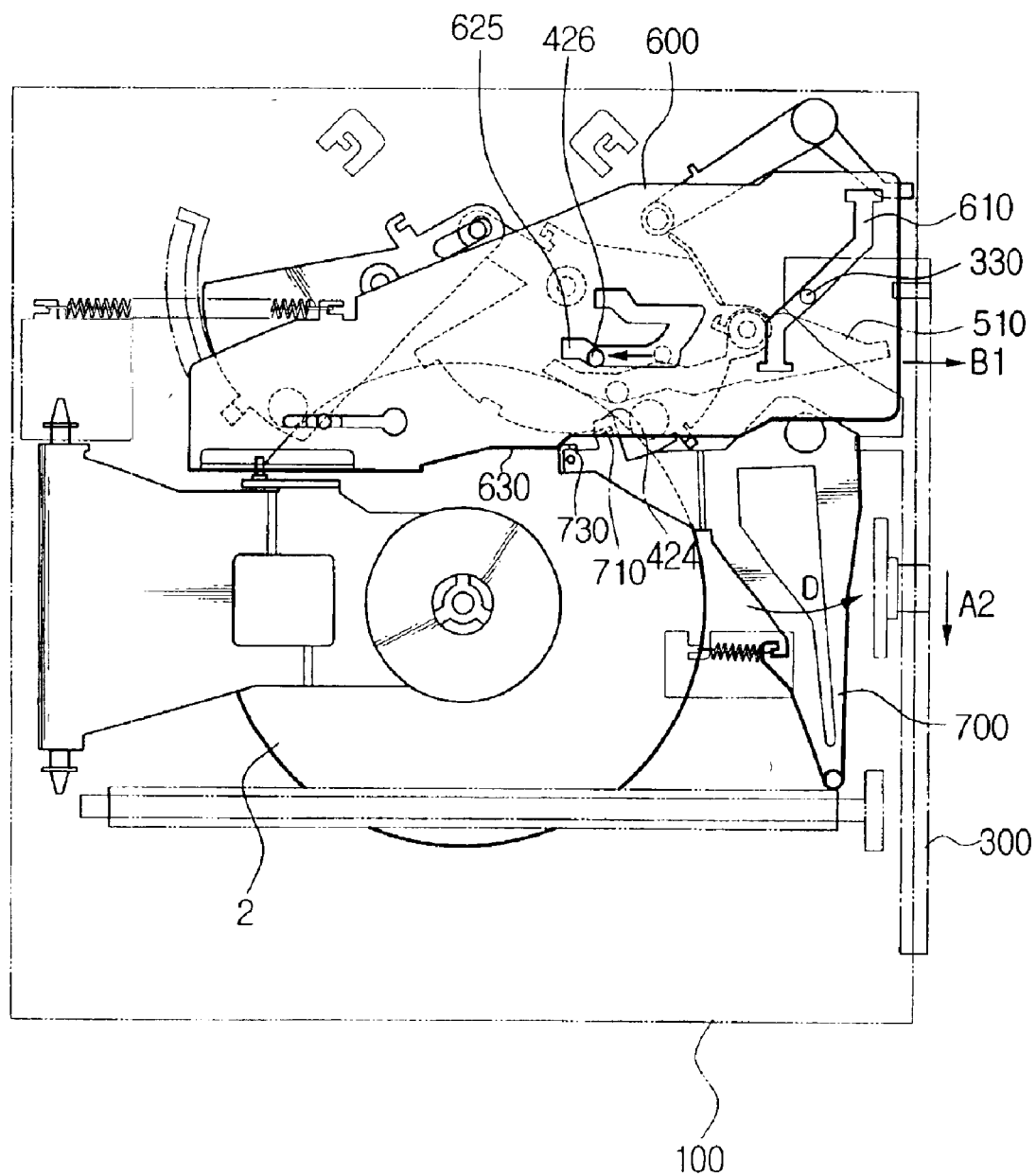
Figure 21:
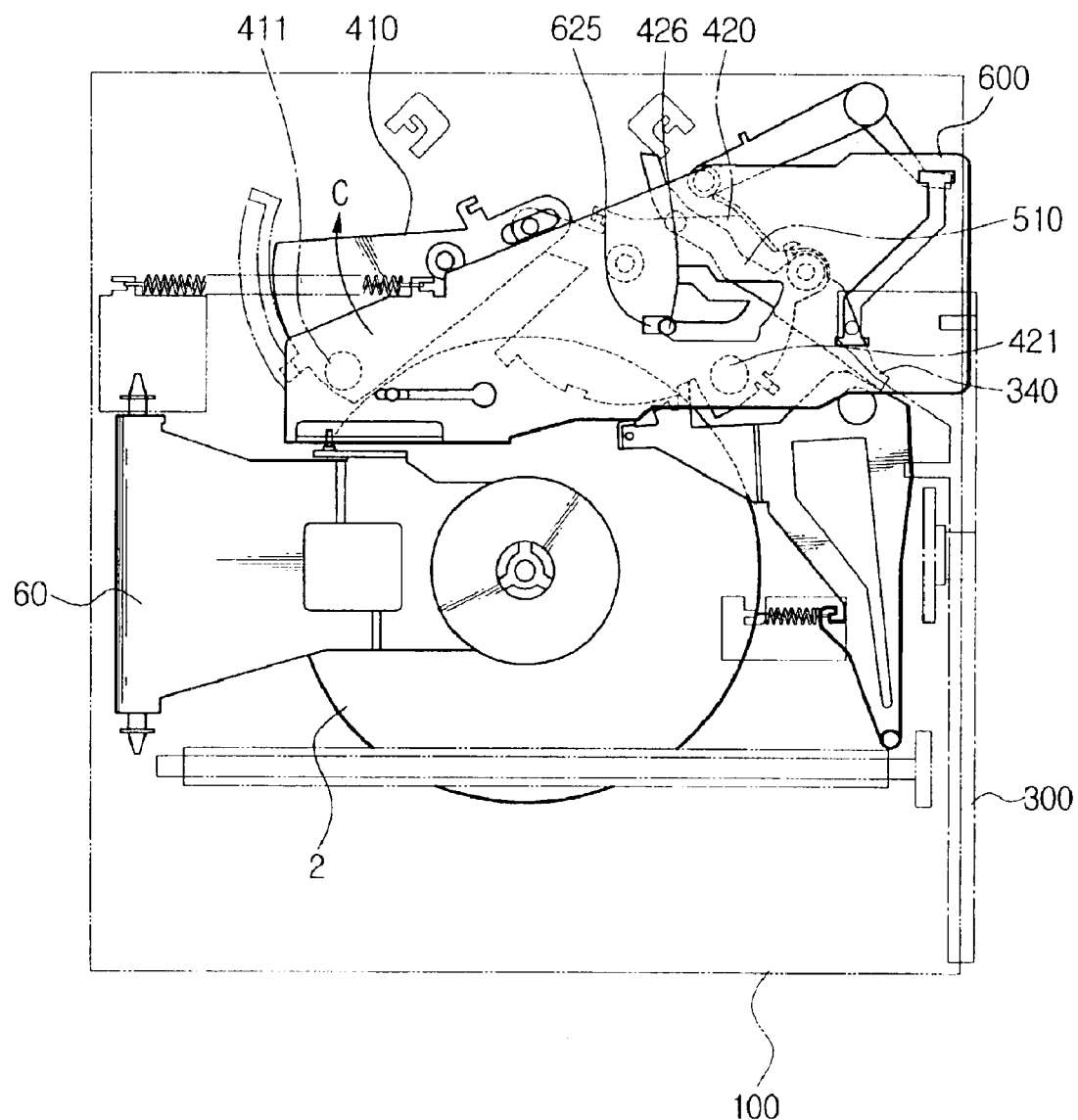

Then, as shown in FIG. 13, the rack gear 310 is engaged with the driving gear 250 as in the case when the first disk 1 is introduced, and thus the slider 300 is continuously moved in the direction A2. If the slide continuously moves in the direction A2, the sub-chassis 600 is guided and moved in the direction B1 by the cam projection 330, as shown in FIG. 20. The guide pin 426 then enters into the second slot part 625. As the sub-chassis 600 is moved in the direction B1, the lower edge 630 pushes away the guide projection 730 of the locking lever 700, thus rotating the locking lever 700 in the direction D. As a result, the locking projection 710 is released from the first locking recess 424.

As the slider 300 is fully moved in the direction A2, the guide pin 426 enters into the second slot part 625 and the second swivel plate 420 is rotated a predetermined amount in the direction D. Of course, the first swivel plate 410 is swiveled in the direction C as it is in linkage with the second swivel plate 420. Therefore, the first and second projections 411 and 421 are separated from the second disk 2.

As the slider 300 is fully moved in the direction A2, the projection 330 provided on the top end of the slider 300 comes into contact with a cam part 511 of the second pushing lever 510 and rotates the second pushing lever 510. The second pushing lever 510 is then rotated in the direction C and separated from the second disk 2 which has been moved to the chucking position.

In the condition described above, the second disk 2 is seated on the turntable (not shown) capable of being rotated in the position that it is chucked by the chucking unit 60. Of course, the feeding roller 110 is separated from the second disk 2 if the second disk 2 is completely chucked, as in the case when the first disk 1 is loaded. The turntable is rotated to a position such that the second disk 2 is completely chucked, and an optical pickup is driven to record information to the second disk 2 or to reproduce recorded information from the second disk 2.

As described in the above, the disk loading device for a disk player in accordance with the present invention can load either of the first and second disks which are different in size into the locking position with a simple construction. In particular, because the operations of the first linkage mechanism and the second linkage mechanism are performed independently with each other and those mechanisms are constructed to be simply linked with the slider, there are advantages in that power loss is very small in power transmission and a disk is neither miss-loaded nor miss-unloaded.

Furthermore, because the cam slot for separating the first and second linkage mechanisms from the disk placed on the chucking position is formed in two stages, the number of needed components can be substantially reduced as compared to the prior art and the disk loading device can be slimmed.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A disk loading device for a disk player, which loads either a first disk or a second disk, which is smaller than the first disk, into a chucking position, comprising:
    a main chassis which is provided with a feeding roller which is adapted to inwardly conveying one of the first and second disks as being introduced;
    a power transmission unit, adapted to transmit the power of a driving motor to the feeding roller;
    a slider which is mounted on the main chassis to be reciprocated in the loading direction of the introduced disk, the slider being selectively connected to the power transmission unit to be driven back and forth, depending on its moving position;
    a first linkage mechanism which guides the first disk to the chucking position while being pushed and moved by the first disk and moves the slider to be connected to the power transmission unit when the first disk is being introduced;
    a second linkage mechanism which connects the slider to the power transmission unit while being pushed and moved by the second disk when the second disk is moved to the chucking position while being contacted with and guided by the first linkage mechanism;
    a sub-chassis which is linked to the slider and reciprocated in the direction transverse to the loading direction, such that the first linkage mechanism linked to the sub-chassis separates the first linkage mechanism from the first disk or the second disk placed on the chucking position; and
    a locking lever which is moved in linkage with the introduced first disk or the sub-chassis, the locking lever selectively locking the movement of the first linkage mechanism or releasing the locking of the first linkage mechanism.

2. The disk loading device according to claim 1, wherein the first linkage mechanism comprises:
    a first swivel plate which is mounted on the main chassis, and adapted to rotate over a predetermined angle, the first swivel plate being pushed and swiveled by the first disk as being introduced;
    a second swivel plate which is linked to the first swivel plate and mounted on the main chassis, and adapted to rotate over a predetermined angle, the second swivel plate being pushed and swiveled by the first disk and selectively locked to or released from the locking lever;
    a first pushing lever which is pivotably mounted on the main chassis, the first pushing lever being linked to the second swivel plate which is pushed and swiveled by the first disk and pushing the slider to be connected to the power transmission unit; and
    first and second springs adapted to elastically bias the first and second swivel plates toward a position, respectively, where the first and second swivel plates come into contact with the first disk.

3. The disk loading device according to claim 2, wherein each of the first and second swivel plate further comprises:
    a guide roller adapted to guide the disk, and wherein, during the introduction of the first disk, each swivel plate is movable between an initial position, a neutral position and a separating position, the swivel plate being in the initial position prior to being contacted with the first disk, the swivel plate being in the neutral position when pushed by the first disk and guided to the chucking position, and the swivel plate being in the separating position when separating the guide roller from the first disk placed in the chucking position.

4. The disk loading device according to claim 3, wherein the second swivel plate comprises:
    a first locking recess which is formed in an edge of the second swivel plate, the first locking recess being locked by the locking lever when the second swivel plate is in the initial position;

a second locking recess which is formed in the edge to be spaced from the first locking recess, the second locking recess being locked by the locking lever when the second swivel plate is in the neutral position; and a guide pin which is guided by the sub-chassis and moves the second swivel plate from the neutral position to the separating position.

5. The disk loading device according to claim 2, wherein the second linkage mechanism comprises:

a second pushing lever which is pivotably mounted on the second swivel plate, the second pushing lever being pushed and swiveled by the second disk when the second disk is introduced, and pushing the slider to be connected to the power transmission unit; and a spring for compressing the second pushing lever toward a position where the pushing lever comes into contact with the introduced second disk.

6. The disk loading device according to claim 5, wherein the second disk is guided to the chucking position by a contact pin provided at one end of the second pushing lever, and the first and second swivel plates.

7. The disk loading device according to claim 6, wherein when the second disk moves to the chucking position, the first and second swivel plates are separated from the second disk by the sub-chassis which is linked to the slider, and the second pushing lever is pushed by the slider and thus separated from the second disk.

8. The disk loading device according to claim 1, wherein the second linkage mechanism comprises:

a second pushing lever which is pivotably supported on the first linkage mechanism, the second pushing lever being pushed and swiveled by the second disk which is moved into the chucking position, and pushing the slider to be connected to the power transmission unit; and a spring for compressing the second pushing lever in the direction where the pushing lever comes into contact with the introduced second disk.

9. The disk loading device according to claim 8, wherein the second pushing lever is contacted with and moved by the first disk, which is introduced into the chucking position, and separated from the first disk by being pushed and swiveled by the main chassis when the first linkage mechanism is separated from the first disk.

10. The disk loading device according to claim 1, wherein the sub-chassis comprises:

a sliding cam slot to which a cam projection provided on the slider is engaged, the cam projection being guided in the direction transverse to the loading direction; and a separating cam slot to which a guide pin provided on the first linkage mechanism is engaged, the guide pin being guided, so that the first linkage mechanism is separated from the first disk or the second disk placed on the chucking position.

11. The disk loading device according to claim 10, wherein the separating cam slot comprises:

an arc shaped main slot part which guides the movement of the guide pin when the first disk moves to the chucking position;

a first slot part which is extended from the upper end of the main slot part to guide the guide pin so that the first linkage mechanism is separated from the first disk placed on the chucking position; and a second slot part which is extended from the main slot part to guide the guide pin so that the second linkage mechanism is separated from the second disk placed on the chucking position.

12. A method for using a disk loading device for a disk player, which loads either a first disk or a second disk, which is smaller than the first disk, into a chucking position, comprising:

conveying inwardly one of the first and second disks as they are being introduced to a feeding roller in a main chassis;

transmitting the power of a driving motor to the feeding roller via a power transmission unit;

connecting selectively a slider to the power transmission unit to be driven back and forth, depending on its moving position, such that the slider is mounted on the main chassis to be reciprocated in the loading direction of the introduced disk;

guiding the first disk via a first linkage mechanism to the chucking position while the first linkage mechanism is being pushed and moved by the first disk, and moving the slider to be connected to the power transmission unit when the first disk is being introduced;

connecting the slider to the power transmission unit via a second linkage mechanism while the second linkage mechanism is being pushed and moved by the second disk when the second disk is moved to the chucking position while being contacted with and guided by the first linkage mechanism;

separating the first linkage mechanism from the first disk or the second disk placed on the chucking position via the first linkage mechanism linked to a sub-chassis which is linked to the slider and reciprocated in the direction transverse to the loading direction; and moving in linkage a locking lever with the introduced first disk or the sub-chassis, such that the locking lever selectively locks the movement of the first linkage mechanism or releases the locking of the first linkage mechanism.

13. The method according to according to claim 12, wherein the first linkage mechanism comprises:

a first swivel plate which is mounted on the main chassis, and adapted to rotate over a predetermined angle, the first swivel plate being pushed and swiveled by the first disk as being introduced;

a second swivel plate which is linked to the first swivel plate and mounted on the main chassis, and adapted to rotate over a predetermined angle, the second swivel plate being pushed and swiveled by the first disk and selectively locked to or released from the locking lever;

a first pushing lever which is pivotably mounted on the main chassis, the first pushing lever being linked to the second swivel plate which is pushed and swiveled by the first disk and pushing the slider to be connected to the power transmission unit; and first and second springs, adapted to elastically bias the first and second swivel plates toward a position, respectively, where the first and second swivel plates come into contact with the first disk.

14. The method according to claim 13, wherein each of the first and second swivel plate further comprises:

a guide roller adapted to guide the disk, and wherein, during the introduction of the first disk, each swivel plate is movable between an initial position, a neutral position and a separating position, the swivel plate being in the initial position prior to being contacted with the first disk, the swivel plate being in the neutral position when pushed by the first disk and guided to the chucking position, and the swivel plate being in the separating position when separating the guide roller from the first disk placed in the chucking position.

15. The method according to claim 14, wherein the second swivel plate comprises:
   a first locking recess which is formed in an edge of the second swivel plate, the first locking recess being locked by the locking lever when the second swivel plate is in the initial position;
   a second locking recess which is formed in the edge to be spaced from the first locking recess, the second locking recess being locked by the locking lever when the second swivel plate is in the neutral position; and
   a guide pin which is guided by the sub-chassis and moves the second swivel plate from the neutral position to the separating position.

16. The method according to claim 13, wherein the second linkage mechanism comprises:
   a second pushing lever which is pivotably mounted on the second swivel plate, the second pushing lever being pushed and swiveled by the second disk when the second disk is introduced, and pushing the slider to be connected to the power transmission unit; and
   a spring for compressing the second pushing lever toward a position where the pushing lever comes into contact with the introduced second disk.

17. The method according to claim 16, wherein the second disk is guided to the chucking position by a contact pin provided at one end of the second pushing lever, and the first and second swivel plates.

18. The method according to claim 17, wherein when the second disk moves to the chucking position, the first and second swivel plates are separated from the second disk by the sub-chassis which is linked to the slider, and the second pushing lever is pushed by the slider and thus separated from the second disk.

19. The method according to claim 12, wherein the second linkage mechanism comprises:
   a second pushing lever which is pivotably supported on the first linkage mechanism, the second pushing lever being pushed and swiveled by the second disk which is moved into the chucking position, and pushing the slider to be connected to the power transmission unit; and
   a spring for compressing the second pushing lever in the direction where the pushing lever comes into contact with the introduced second disk.

20. The method according to claim 19, wherein the second pushing lever is contacted with and moved by the first disk, which is introduced into the chucking position, and separated from the first disk by being pushed and swiveled by the main chassis when the first linkage mechanism is separated from the first disk.

21. The method according to claim 12, wherein the sub-chassis comprises:
   a sliding cam slot to which a cam projection provided on the slider is engaged, the cam projection being guided in the direction transverse to the loading direction; and
   a separating cam slot to which a guide pin provided on the first linkage mechanism is engaged, the guide pin being guided, so that the first linkage mechanism is separated from the first disk or the second disk placed on the chucking position.

22. The method according to claim 21, wherein the separating cam slot comprises:
   an arc shaped main slot part which guides the movement of the guide pin when the first disk moves to the chucking position;
   a first slot part which is extended from the upper end of the main slot part to guide the guide pin so that the first linkage mechanism is separated from the first disk placed on the chucking position; and
   a second slot part which is extended from the main slot part to guide the guide pin so that the second linkage mechanism is separated from the second disk placed on the chucking position.

* * * * *